United States Patent
Itakura

(10) Patent No.: US 12,159,348 B2
(45) Date of Patent: Dec. 3, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kina Itakura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 17/984,315

(22) Filed: Nov. 10, 2022

(65) Prior Publication Data

US 2023/0162442 A1 May 25, 2023

(30) Foreign Application Priority Data

Nov. 25, 2021 (JP) ................. 2021-191006

(51) Int. Cl.
*G06T 17/10* (2006.01)
*G06T 7/60* (2017.01)
*G06T 15/20* (2011.01)

(52) U.S. Cl.
CPC ............. *G06T 17/10* (2013.01); *G06T 7/60* (2013.01); *G06T 15/20* (2013.01)

(58) Field of Classification Search
CPC .......... G06T 17/10; G06T 7/60; G06T 17/05; G06T 15/20; G06T 15/205
See application file for complete search history.

(56) References Cited

U.S. PATENT DOCUMENTS 7,307,655 B1    12/2007  Okamoto et al.
2014/0118341 A1*  5/2014  Shimizu ................. G06V 20/56
                                                              345/419
2019/0349571 A1* 11/2019  Herman ............... H04N 23/698

FOREIGN PATENT DOCUMENTS

JP    2020166652 A  * 10/2020
WO    00/07373 A1     2/2000

* cited by examiner

*Primary Examiner* — Jeffery A Brier
(74) *Attorney, Agent, or Firm* — Venable LLP

(57) ABSTRACT

First, an image processing apparatus obtains data of a captured image obtained by image capturing with an image capturing apparatus that captures an image of a surrounding of a reference point, and obtains distance information indicating a distance from the reference point to an object present in a vicinity of the reference point. Next, the image processing apparatus obtains first three-dimensional shape data corresponding to a shape of the object, based on the distance information. Then, the image processing apparatus obtains second three-dimensional shape data that corresponds to the surrounding of the reference point other than the object and that is formed of one or more flat planes or curved planes. Then, the image processing apparatus obtains third three-dimensional shape data in which the first three-dimensional shape data and the second three-dimensional shape data are integrated, and maps the captured image to the third three-dimensional shape data.

19 Claims, 19 Drawing Sheets

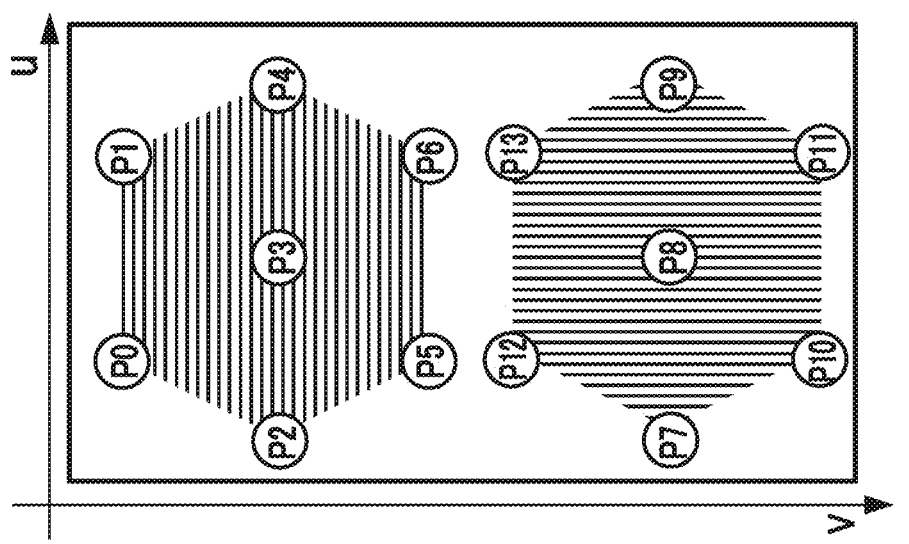
FIG.2C
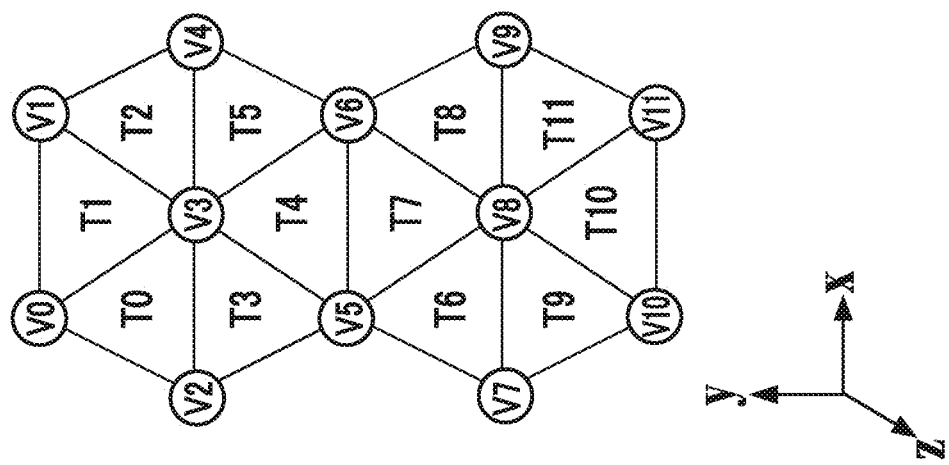
FIG.2B
FIG.2A

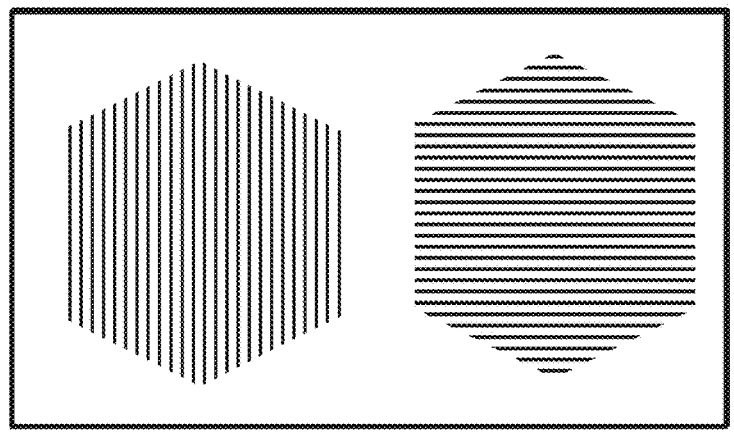

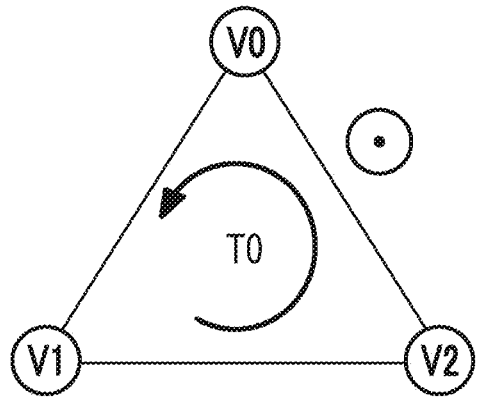
FIG.4A
| | TRIANGLE | VERTEX ID | | |
|---|---|---|---|---|
| (1) | T0 | V0 | V1 | V2 |
| (2) | T0 | V1 | V2 | V0 |
| (3) | T0 | V2 | V0 | V1 |
FIG.4B
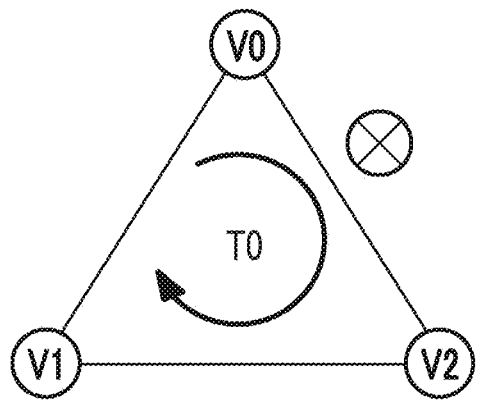
FIG.4C
| | TRIANGLE | VERTEX ID | | |
|---|---|---|---|---|
| (4) | T0 | V0 | V2 | V1 |
| (5) | T0 | V2 | V1 | V0 |
| (6) | T0 | V1 | V0 | V2 |
FIG.4D

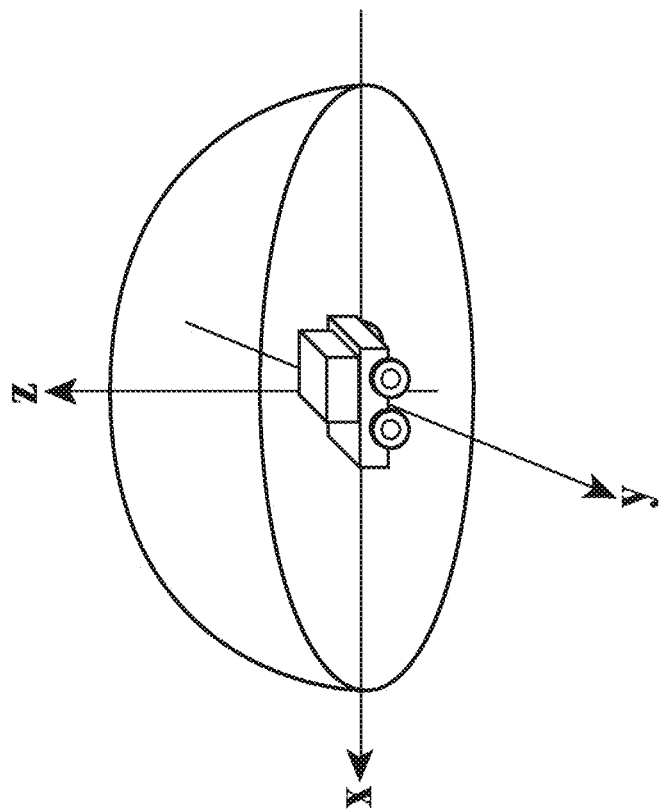
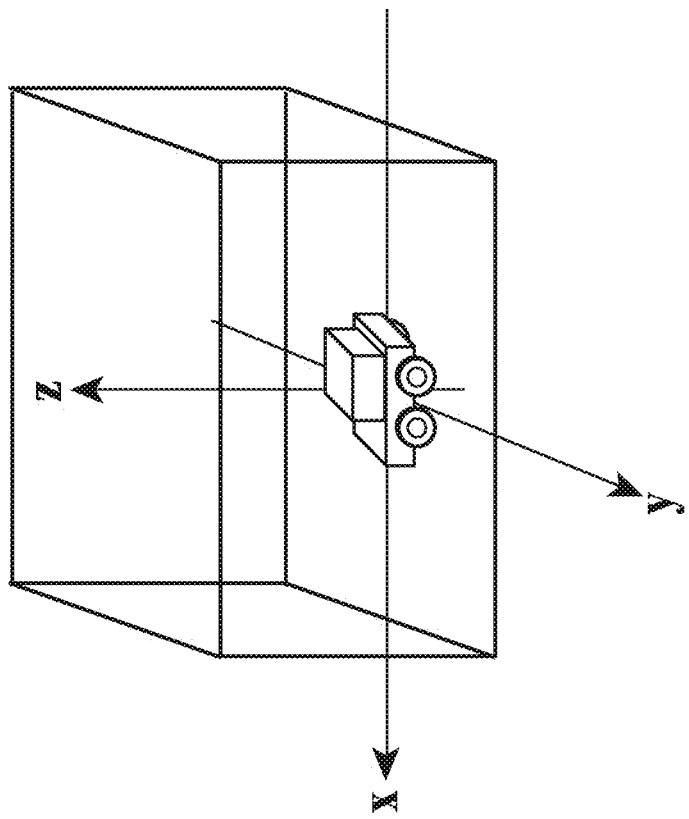
FIG.11A
FIG.11B

IMAGE PROCESSING APPARATUS, IMAGE PROCESSING METHOD, AND STORAGE MEDIUM

BACKGROUND OF THE INVENTION

Field

The present disclosure relates to a technique of generating a three-dimensional shape data with texture.

Description of the Related Art

In a technical field of monitoring an environment around a reference point such as a vehicle, there is a technique of generating an image (hereinafter, referred to as "virtual viewpoint image") corresponding to a picture of a surrounding of the reference point viewed from any virtual viewpoint by using captured images obtained by image capturing with multiple image capturing apparatuses installed at the reference point. International Publication No. WO00/007373 discloses a method as follows. Three-dimensional shape data that is obtained by combining multiple pieces of three-dimensional shape data indicating flat plane shapes or curved plane shapes and that indicate a space shape corresponding to an environment around the reference point is generated and a captured image obtained by image capturing from the reference point is mapped to the generated three-dimensional shape data. According to the method disclosed in International Publication No. WO00/007373, a virtual viewpoint image corresponding to a picture viewed from any virtual viewpoint can be generated based on data indicating three-dimensional shape with texture obtained by mapping the captured image to the generated three-dimensional shape data.

Specifically, International Publication No. WO00/007373 discloses a method of combining three-dimensional shape data corresponding to a road surface around the reference point and three-dimensional shape data of an upright plane having a predetermined shape and arranged in a virtual space based only on a position of an object near the reference point. The method disclosed in International Publication No. WO00/007373 can reduce distortion or tilting in the virtual viewpoint image. In this case, the distortion or tilting in the virtual viewpoint image means difference in the virtual viewpoint image from an image obtained in the case where image capturing is actually performed from the virtual viewpoint.

However, since the shape of the upright plane disclosed in International Publication No. WO00/007373 is the predetermined shape, the shape of the upright plane is different from the original shape of the object. Accordingly, in the method disclosed in International Publication No. WO00/007373, in the mapping of the captured image to the three-dimensional shape data of the upright plane, not only an image region corresponding to the object in the captured image but also an image region other than the image region corresponding to the object are mapped. As a result, in the method disclosed in International Publication No. WO00/007373, the distortion or tilting remains in an image region around an image region corresponding to the object in the virtual viewpoint image and an accurate virtual viewpoint image cannot be obtained.

An object of the present disclosure is to provide an image processing apparatus that can obtain three-dimensional shape data with texture from which an accurate virtual viewpoint image can be generated, even in the case where there is an object is near a reference point.

SUMMARY

An aspect according to the present disclosure is an image processing apparatus comprising: one or more hardware processors; and one or more memories storing one or more programs configured to be executed by the one or more hardware processors, the one or more programs including instructions for: obtaining data of a captured image obtained by image capturing with an image capturing apparatus that captures an image of a surrounding of a reference point; obtaining distance information indicating a distance from the reference point to an object present in a vicinity of the reference point; obtaining first three-dimensional shape data corresponding to a shape of the object, based on the distance information; obtaining second three-dimensional shape data that corresponds to the surrounding of the reference point other than the object and that is formed of one or more flat planes or curved planes; obtaining third three-dimensional shape data in which the first three-dimensional shape data and the second three-dimensional shape data are integrated; and mapping the captured image to the third three-dimensional shape data.

Further features of the present invention will become apparent from the following description of exemplary embodiments with reference to the attached drawings.

BRIEF DESCRIPTION OF THE DRAWINGS

FIG. 2A is a diagram visualizing an example of multiple triangular polygons and vertices in each triangular polygon, FIG. 2B is a diagram visualizing an example of positions in the texture image, and FIG. 2C is a diagram illustrating an example of information for associating the triangular polygons, the vertices of the triangular polygons, and positions in the texture image with one another;

FIG. 3A is a diagram illustrating an example of a vertex coordinate list, FIG. 3B is a diagram illustrating an example of a texture vertex coordinate list, FIG. 3C is a diagram illustrating an example of a correspondence table indicating associations among the triangular polygons, vertex IDs, and texture vertex IDs, and FIG. 3D is a diagram illustrating an example of the texture image;

FIGS. 4A, 4B, 4C, and 4D are diagrams illustrating examples of a relationship between the arrangement order of the vertex IDs in the correspondence table and a front surface of the triangular polygon;

FIGS. 11A and 11B are diagrams visualizing an example of data of a reference three-dimensional shape with height direction component according to Embodiment 1;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Figure 1C:
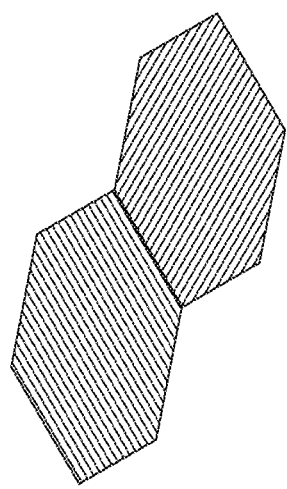
FIG. 1C is a diagram illustrating an example of a virtual viewpoint image.
Figure 1B:
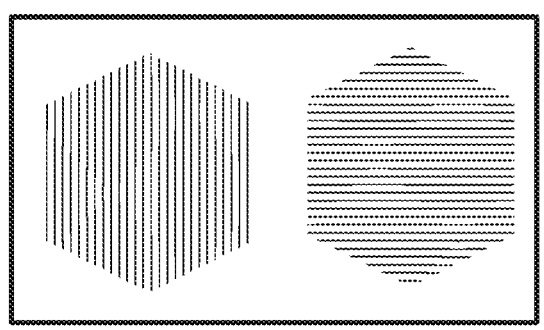
FIG. 1B is a conceptual diagram illustrating an example of a texture image.
Figure 1A:
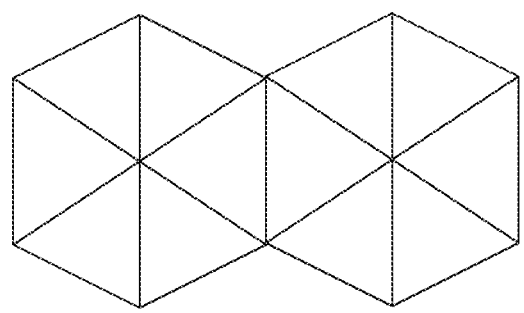
FIG. 1A is a diagram visualizing an example of three-dimensional shape data.

Before giving description of embodiments according to the present disclosure, description is given of an outline of a method of generating three-dimensional shape data with texture according to the present disclosure with reference to FIGS. 1A to 4D. FIG. 1A is a diagram visualizing an example of three-dimensional shape data before mapping of a texture. FIG. 1B is a conceptual diagram illustrating an example of an image (hereinafter, referred to as "texture image") of the texture to be mapped to the three-dimensional shape data illustrated in FIG. 1A. The three-dimensional shape data with texture is generated by mapping (hereinafter, also referred to as "attaching") the texture image illustrated in FIG. 1B to the three-dimensional shape data illustrated in FIG. 1A. FIG. 1C is a diagram illustrating an example of a virtual viewpoint image generated by performing a three-dimensional rendering process on the generated three-dimensional shape data with texture based on information indicating a certain virtual viewpoint specified by a user operation or the like. In this case, the information indicating the virtual viewpoint is information indicating a position of the virtual viewpoint, a line of sight, and the like.

Description is given below assuming that the three-dimensional shape data illustrated as an example in FIG. 1A is formed of a combination of multiple polygons of triangles (hereinafter, referred to as "triangular polygons") each formed of three vertices. FIG. 2A is a diagram visualizing an example of multiple triangular polygons in the three-dimensional shape data illustrated in FIG. 1A and vertices of each triangular polygon. As illustrated as an example in FIG. 2A, the three-dimensional shape data illustrated in FIG. 1A is formed of twelve triangular polygons T0 to T11 and twelve vertices V0 to V11 forming these polygons as elements for expressing the three-dimensional shape data. FIG. 2B is a diagram visualizing an example of positions P0 to P13 in the texture image illustrated in FIG. 1B that correspond to the vertices V0 to V11 forming the triangular polygons T0 to T11 illustrated in FIG. 2A.

FIG. 2C is a diagram illustrating an example of information that associates the triangular polygons T0 to T11 and the vertices V0 to V11 illustrated in FIG. 2A with the positions P0 to P13 in the texture image illustrated in FIG. 2B. As illustrated in FIG. 2C, for each of the triangular polygons T0 to T11, vertex IDs that indicates the vertices forming this triangular polygon among the vertices V0 to V11 in a three-dimensional space are associated with texture vertex IDs indicating corresponding positions among the positions P0 to P13 in the texture image. The three-dimensional shape data with texture in which the texture image illustrated in FIG. 1B is attached to the three-dimensional shape data illustrated in FIG. 1A can be thereby generated. The coordinates of each of the vertices V0 to V11 forming the triangular polygons T0 to T11 illustrated in FIG. 2A are expressed as three-dimensional space coordinates by using components respectively in predetermined x, y, and z-axes as illustrated as an example in FIG. 2A. The coordinates of each of the positions P0 to P13 in the texture image illustrated in FIG. 2B are expressed as two-dimensional space coordinates by using components respectively in predetermined u and v axes as illustrated as an example in FIG. 2B.

In many cases, the vertices forming the triangular polygons are in one-to-one correspondence with the positions of the vertices in the texture image like the vertices V0 to V4 and the vertices V7 to V11 illustrated in FIG. 2C and can be expressed with index numbers matching those of the positions. Meanwhile, one vertex in the three-dimensional space sometimes corresponds to multiple different vertices in the texture image in the two-dimensional space as in the case where the vertex V5 corresponds to the positions P5 and P12 of the vertices in the texture image. In FIG. 2C, the vertex IDs and the texture vertex IDs are independently managed to allow processing of associating each of the vertices forming the triangular polygons with the corresponding vertex in the texture image even in such a correspondence relationship.

FIG. 3A is a diagram illustrating an example of a vertex coordinate list indicating associations between the vertex IDs and the three-dimensional space coordinates of the vertices corresponding to the vertex IDs. FIG. 3B is a diagram illustrating an example of a texture vertex coordinate list indicating associations between the texture vertex IDs and the two-dimensional space coordinates of the vertices in the texture image corresponding to the texture vertex IDs. FIG. 3C is a diagram illustrating an example of a correspondence table indicating associations among the triangular polygons, the vertex IDs, and the texture vertex IDs. FIG. 3D is a diagram illustrating an example of the texture image. A dataset of the three-dimensional shape data with texture is formed of the data of the texture image as well as the vertex coordinate list, the texture vertex coordinate list, and the correspondence table illustrated as examples in FIGS. 3A, 3B, and 3C, respectively.

In the correspondence table illustrated in FIG. 3C, the arrangement order of the vertex IDs may also have a function of defining a front surface of the triangular polygon. FIGS. 4A, 4B, 4C, and 4D are diagrams illustrating an example of relationships between the arrangement order of the vertex IDs in the correspondence table and the front surface of the triangular polygon. The triangular polygon T0 illustrated in FIGS. 4A, 4B, 4C, and 4D is formed of the vertices V0, V1, and V2 as an example. There are six types of the arrangement order of the vertex IDs in the triangular polygon T0 as illustrated in FIGS. 4B and 4D. For example, the front surface of the triangular polygon T0 can be defined to be a surface facing a direction in which a right-hand screw proceeds in the case where the screw is rotated in a direction in which the vertices forming the triangular polygon described in the correspondence table are traced one by one from the left in the three-dimensional space coordinates. A set of FIGS. 4A and 4B and a set of FIGS. 4C and 4D each illustrate a set of the orders of vertices in the correspondence table for which the front surface of the triangular polygon faces the same direction. In the triangular polygon T0 illustrated in FIGS. 4A and 4B, the surface facing in the direction from the back side toward the front side of the sheet in which FIG. 4A is illustrated, that is the surface of the sheet in which FIG. 4A is illustrated is the front surface of the triangular polygon T0. Meanwhile, in the triangular polygon T0 illustrated in FIGS. 4C and 4D, the surface facing in the direction from the front side toward the back side of the sheet in which FIG. 4C is illustrated, that is the surface opposite to the surface of the sheet in which FIG. 4C is illustrated is the front surface of the triangular polygon T0.

Note that the definition of the front surface of the triangular polygon is not limited to the surface facing in the direction in which a right-hand screw proceeds in the case where the screw is rotated in the direction in which the vertices forming the triangular polygon described in the correspondence table are traced one by one from left in the three-dimensional space coordinates. For example, the direction in which the front surface of the triangular polygon faces may be defined as a direction in which a left-hand screw proceeds that is a direction in which the right-hand screw retreats in the case where the screw is rotated in the aforementioned direction.

Moreover, although the three-dimensional shape data is formed of the combination of multiple triangular polygons in the aforementioned description, the form of data expression of the three-dimensional shape data is not limited to this. For example, the three-dimensional shape data may be formed of a combination of multiple polygons each formed of four or more vertices such as quadrilateral or pentagonal polygons or a combination of two or more types of polygons with different numbers of vertices.

Moreover, although the correspondence relationships between the triangular polygons and, the coordinates of the vertices of the triangular polygons and the coordinates of the vertices in the texture image, are expressed by using the data of the vertex coordinate list, the texture vertex coordinate list, and the correspondence table, the expression of the correspondence relationships is not limited to this. For example, the triangular polygons, the coordinates of the vertices of the triangular polygons, and the coordinates of the vertices in the texture image may be directly associated with one another in the correspondence table.

The embodiments of the present disclosure are described below with reference to the drawings. Note that the following embodiments do not limit the present disclosure and not all combinations of features described in the embodiments are necessary for solving means of the present disclosure. Note that the identical configurations or the identical processes are denoted by the identical reference numerals and description thereof is omitted.

Embodiment 1

An image processing apparatus according to Embodiment 1 is described with reference to FIGS. 5 to 11B. The image processing apparatus according to Embodiment 1 generates two pieces of three-dimensional shape data (hereinafter, referred to as "first three-dimensional shape data" and "second three-dimensional shape data") different from each other. Moreover, the image processing apparatus according to Embodiment 1 integrates the generated first three-dimensional shape data and second three-dimensional shape data to generate third three-dimensional shape data expressing a shape of a space in which a reference point such as a vehicle is present. Furthermore, the image processing apparatus according to Embodiment 1 maps a texture image to the generated third three-dimensional shape data to generate three-dimensional shape data with texture and generates a virtual viewpoint image by using the generated three-dimensional shape data with texture.

Figure 5:
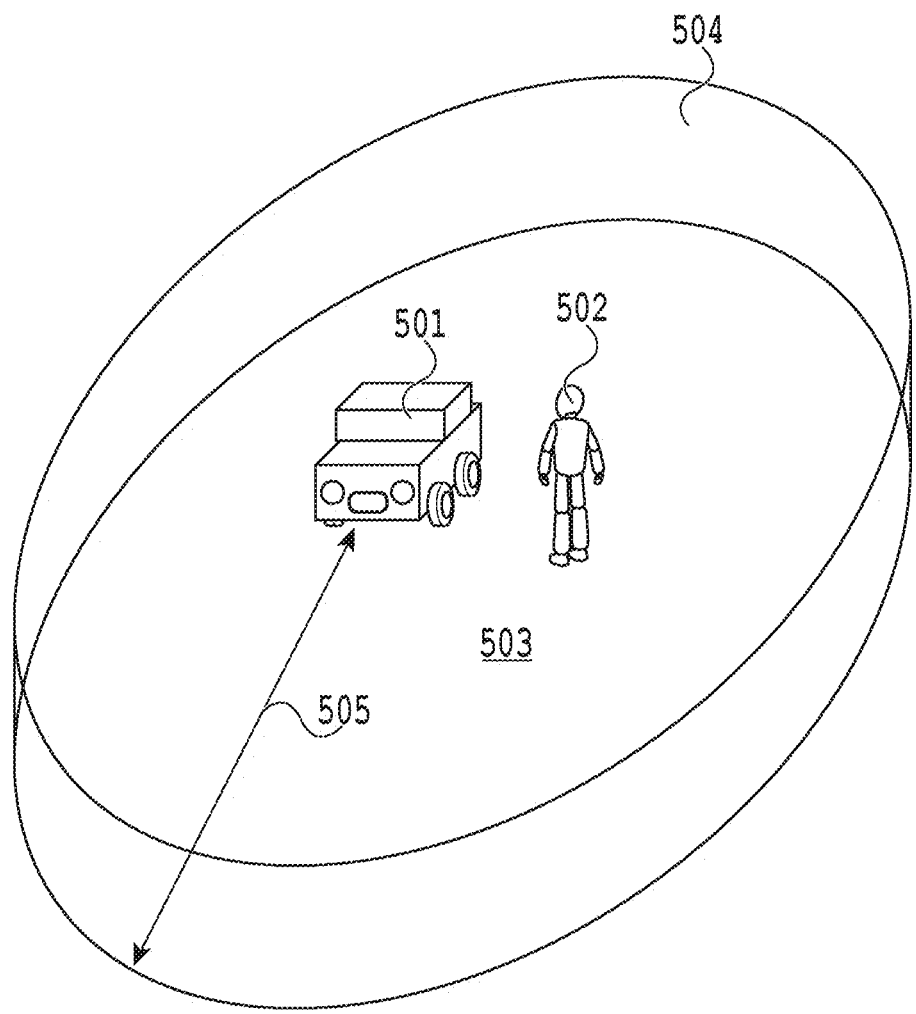
FIG. 5 is an explanatory diagram for explaining an example of a process of generating the virtual viewpoint image in an image processing apparatus according to Embodiment 1.

An outline of a process of generating the virtual viewpoint image in the image processing apparatus according to Embodiment 1 is described with reference to FIG. 5. FIG. 5 is an explanatory diagram for explaining an example of the process of generating the virtual viewpoint image in the image processing apparatus according to Embodiment 1. A three-dimensional shape 502 is a shape visualizing an example of the first three-dimensional shape data. The first three-dimensional shape data is generated based on distance information such as point cloud data that is obtained by using output values of a ranging sensor installed in a vehicle 501 and that indicates a distance from a reference point to an object present in a vicinity of the vehicle 501. Description is given below assuming that the distance information is the point cloud data and the first three-dimensional shape data is generated based on the point cloud data, as an example. The first three-dimensional shape data is formed of a combination of multiple triangular polygons each having multiple points indicated by the point cloud data as vertices. Although description is given below assuming that the point cloud data is obtained by light detection and ranging (LiDAR), the point cloud data is not limited to data obtained by LiDAR. For example, the point cloud data may be data obtained by radio detection and ranging (RADAR), sound navigation and ranging (SONAR), or the like.

The LiDAR is an apparatus that emits laser light such as near-infrared light or visible light as emitted light and captures reflected light reflected on an object with an optical sensor to measure a distance from the reference point to the object based on a phase difference, a frequency difference, or the like between the emitted light and the reflected light. The LiDAR can accurately obtain the distance to the object across a wide range as the point cloud data, though depending on the performance of the LiDAR. Moreover, the density of the emitted light emitted by the LiDAR is high at a position close to the vehicle 501, that is the installation position of the LiDAR. Accordingly, the accurate position and shape can be obtained for an object located at a position close to the installation position of the LiDAR, as the point cloud data. Thus, the first three-dimensional shape data generated by using the point cloud data obtained by the LiDAR is highly-accurate data accurately reproducing the actual shape of the object as long as the distance from the installation position of the LiDAR to the object is within a predetermined range.

A flat plane shape 503 is a shape visualizing three-dimensional shape data corresponding to a road surface such as a ground surface or a floor surface on which the vehicle 501 is present. A curved plane shape 504 is a shape visualizing three-dimensional shape data corresponding to a distant view in an environment around the vehicle 501. The curved plane shape 504 is a shape having a component in a height direction with respect to the flat plane shape 503. The second three-dimensional shape data according to the present embodiment is described as data generated by combining the flat plane shape 503 and the curved plane shape 504, that is combining multiple pieces of three-dimensional shape data corresponding to the environment in which the vehicle is present. Note that the second three-dimensional shape data is not limited to the combination of the flat plane shape 503 and the curved plane shape 504. For example, the second three-dimensional shape data may be data formed of only one of the flat plane shape 503 and the curved plane shape 504 or data formed of one curved plane shape in which a boundary between the flat plane shape 503 and the curved plane shape 504 is smoothly connected. Moreover, the flat plane shape 503 corresponding to the road surface on which the vehicle 501 is present is not limited to a uniform flat plane shape and may be a shape with unevenness in the height direction such as a substantially-flat plane. Moreover, the curved plane shape 504 corresponding to the distant view or the like in the environment around the vehicle is not limited to the curved plane shape and may be formed by combining multiple flat plane shapes or the like.

The point cloud data that can be obtained by the ranging sensor installed to generate the first three-dimensional shape data has the following limitations. Specifically, the maximum distance or the angle of view of the point cloud data measurable by the ranging sensor is limited by the specifications of the ranging sensor, the number of ranging sensors installed, or the like. Moreover, in the case where the object is at a position close to the ranging sensor, the ranging sensor cannot obtain the point cloud data corresponding to another object located behind the object at the close position.

Meanwhile, objects at positions away from the vehicle by various distances such as a distant vehicle are sometimes included in the virtual viewpoint image, depending on the position of the certain virtual viewpoint set in the generation of the virtual viewpoint image or an image capturing range of the virtual viewpoint image. For example, objects that are distant from the vehicle include buildings such as houses and facilities present in the vicinity of the road on which the vehicle is traveling. The image processing apparatus according to the present embodiment generates the second three-dimensional shape data obtained by combining the three-dimensional shape data of the flat plane shape or the curved plane shape corresponding to distant objects that cannot be expressed in the first three-dimensional shape data generated by using the point cloud data. The image processing apparatus according to the present embodiment can thereby obtain a virtual viewpoint image in which image quality degradation such as distortion or tilting is reduced in image regions corresponding to the distant objects that cannot be expressed in the first three-dimensional shape data.

Note that the following effects can be obtained by including three-dimensional shape data such as the curved plane shape 504 that has a component in the height direction with respect to the flat plane shape 503 and that indicates a plane surrounding the vehicle 501, in the second three-dimensional shape data. If an object with a certain height such as a building is made to correspond to the flat plane shape 503, image quality degradation such as distortion or tilting occurs in an image region corresponding to the object in the virtual viewpoint image due to difference in shape between the flat plane shape 503 and the object that originally have the certain height. Meanwhile, including data of a shape of a plane having a component in the height direction with respect to the flat plane shape 503 such as a plane perpendicular to the flat plane shape 503 like the curved plane shape 504 in the second three-dimensional shape data allows the environment around the vehicle and the object such as a building to be more faithfully expressed. As a result, image quality degradation such as distortion or tilting can be reduced in the image region corresponding to the aforementioned object in the virtual viewpoint image. Specifically, mapping the texture image to the third three-dimensional shape data in which the first three-dimensional shape data and the second three-dimensional shape data are integrated enables generation of the virtual viewpoint image in which a balance between an object near the vehicle and an object distant from the vehicle is achieved. Note that perpendicular herein is not limited to exactly perpendicular and may include substantially perpendicular.

Figure 19A:
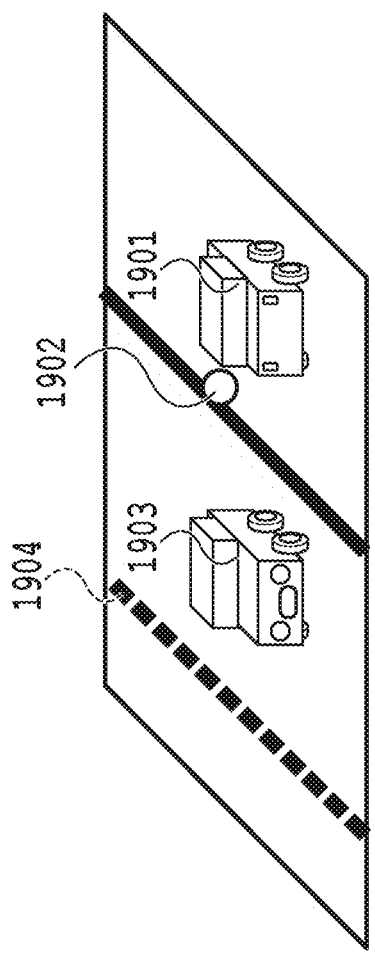
FIG. 19A is a diagram illustrating an example of a positional relationship between a vehicle and a broken line indicating a lane or the like on a road surface.

Description is given of differences between the virtual viewpoint image generated by the image processing apparatus according to the present disclosure and a virtual viewpoint image generated by using the method disclosed in International Publication No. WO00/007373, with reference to FIGS. 19A, 19B, 19C, and 19D. Description is given below of a virtual viewpoint image corresponding to a picture in which an area on the left side of a vehicle 1901 is viewed from a virtual viewpoint 1902 located on the left side of the vehicle 1901, obtained by using an image capturing apparatus and a ranging sensor installed in the vehicle 1901, as an example. As illustrated in FIG. 19A, a vehicle 1903 is present on the left side of the vehicle 1901 and a broken line 1904 indicating a lane or the like on a road surface is present behind the vehicle 1903 as viewed from the vehicle 1901.

Figure 19D:
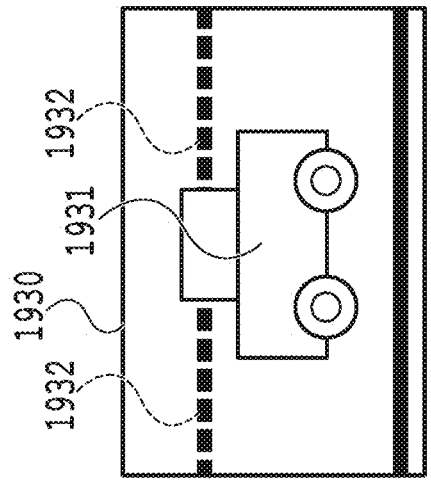
FIG. 19D is an example of a virtual viewpoint image generated by the image processing apparatus according to the present disclosure.
Figure 19C:
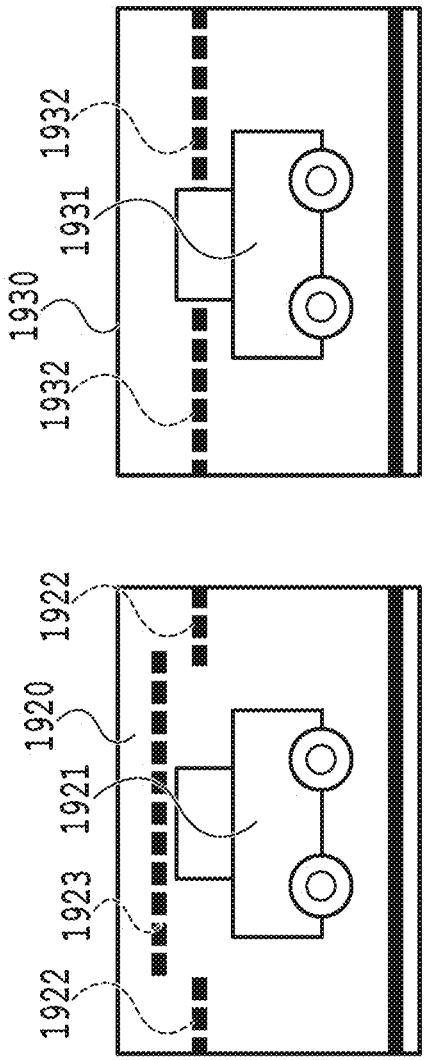
FIGS. 19B and 19C are examples of virtual viewpoint images generated by using a method disclosed in International Publication No. WO00/007373.
Figure 19B:
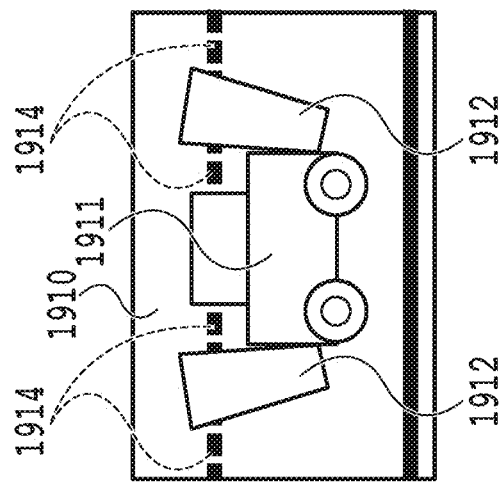

FIGS. 19B and 19C are examples of virtual viewpoint images 1910 and 1920 generated by using the method disclosed in International Publication No. WO00/007373. Particularly, the virtual viewpoint image 1910 illustrated in FIG. 19B is an image generated in the case where the area of an upright plane corresponding to the vehicle 1903 is smaller than the area of a plane corresponding to the surface of the vehicle 1903 in the virtual space and the upright plane includes only a partial region of the plane corresponding to the surface of the vehicle 1903. Meanwhile, the virtual viewpoint image 1920 illustrated in FIG. 19C is an image generated in the case where the area of an upright plane corresponding to the vehicle 1903 is larger than the area of a plane corresponding to the surface of the vehicle 1903 in the virtual space and the upright plane includes regions other than a region of the plane corresponding to the surface of the vehicle 1903.

In the virtual viewpoint image 1910 illustrated in FIG. 19B, there are an image region 1911 corresponding to the vehicle 1903 and image regions 1914 corresponding to the broken line 1904. However, in the virtual viewpoint image 1910, since the upright plane is small, portions of the image corresponding to the vehicle 1903 appear in image regions 1912 in which the road surface or the broken line 1904 is supposed to be imaged. Meanwhile, in the virtual viewpoint image 1920 illustrated in FIG. 19C, there are an image region 1921 corresponding to the vehicle 1903 and image regions 1922 and 1923 corresponding to the broken line 1904. However, in the virtual viewpoint image 1920, since the upright plane is large, the broken line 1904 that is supposed to be imaged to extend along one straight line appears separately in the image regions 1922 and the image region 1923. The virtual viewpoint images 1910 and 1920 generated by using the method disclosed in International Publication No. WO00/007373 are distorted images as described above unlike an actual picture as viewed from the virtual viewpoint.

FIG. 19D is an example of a virtual viewpoint image 1930 generated by the image processing apparatus according to the present disclosure. In the virtual viewpoint image 1930 illustrated in FIG. 19D, there are an image region 1931 corresponding to the vehicle 1903 and image regions 1932 corresponding to the broken line 1904. Unlike the virtual viewpoint images 1910 or 1920 illustrated in FIG. 19B or 19C, the virtual viewpoint image 1930 is an image in which the first three-dimensional shape data is data corresponding to the shape of the surface of the vehicle 1903 and there is thus no distortion around the image region 1931.

Figure 6:
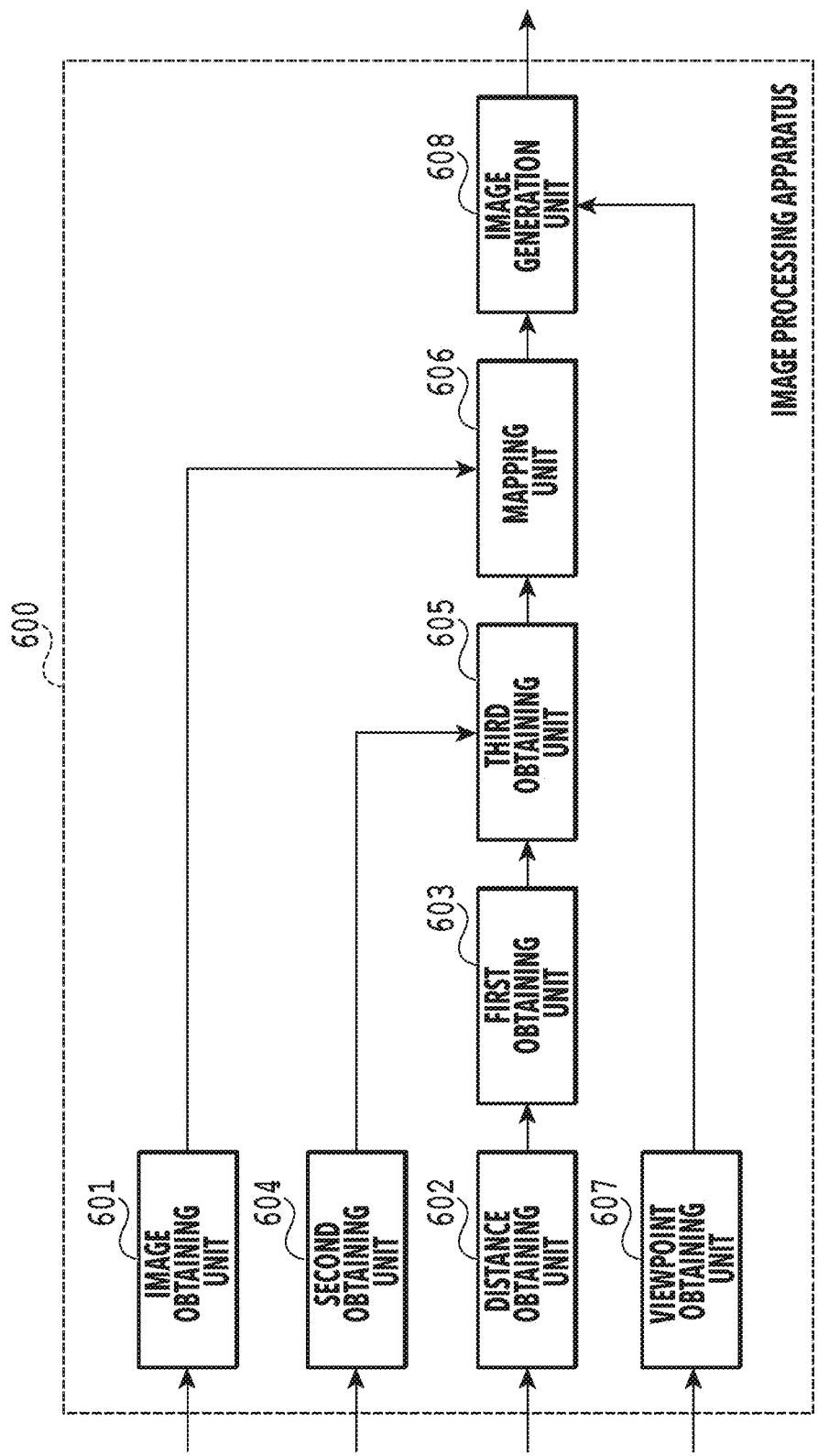
FIG. 6 is a block diagram illustrating an example of a configuration of functional blocks in the image processing apparatus according to Embodiment 1.
Figure 7:
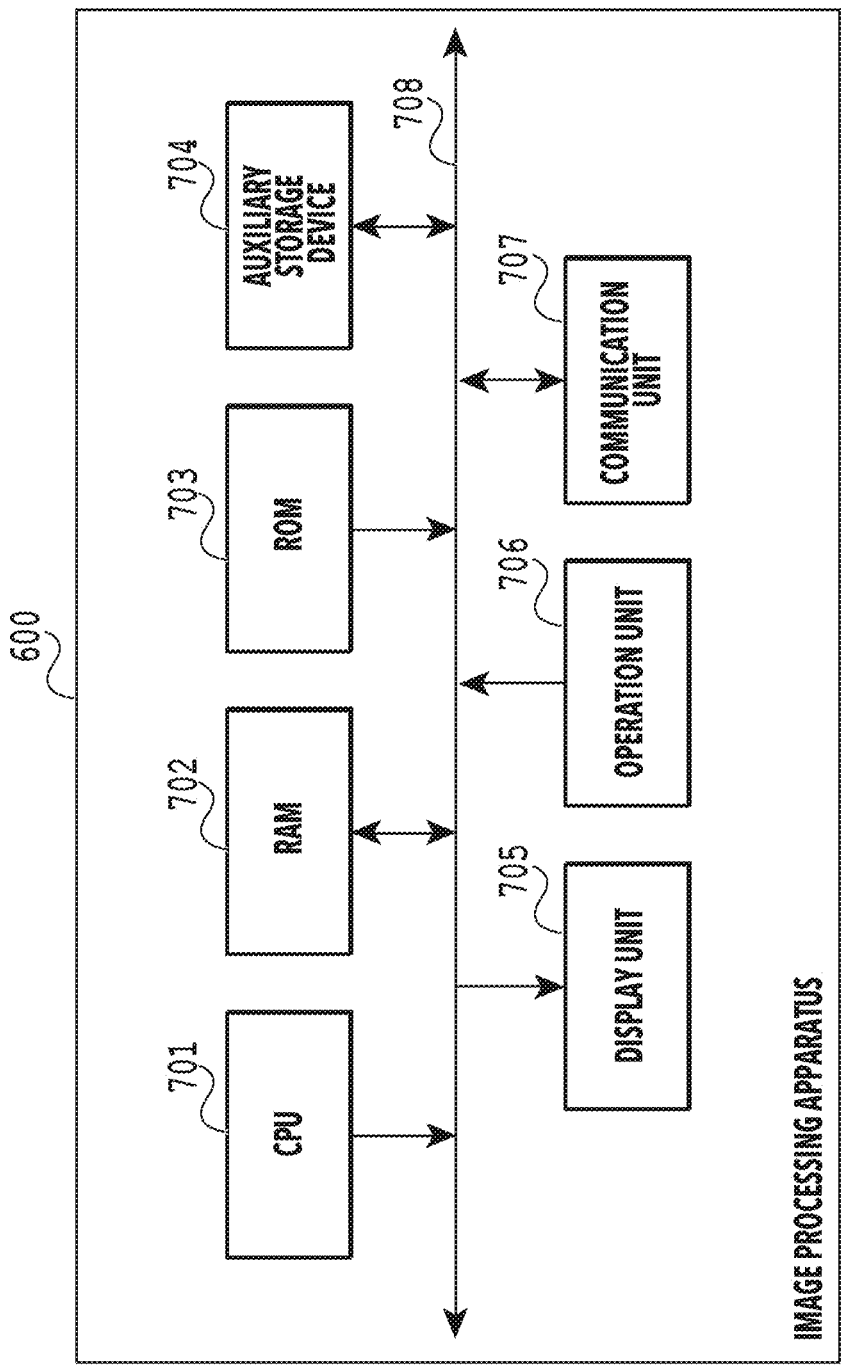
FIG. 7 is a block diagram illustrating an example of a hardware configuration of the image processing apparatus according to Embodiment 1.

A configuration of an image processing apparatus 600 according to Embodiment 1 is described with reference to FIGS. 6 and 7. FIG. 6 is a block diagram illustrating an example of a configuration of functional blocks in the image processing apparatus 600 according to Embodiment 1. The image processing apparatus 600 includes an image obtaining unit 601, a distance obtaining unit 602, a first obtaining unit 603, a second obtaining unit 604, a third obtaining unit 605, a mapping unit 606, a viewpoint obtaining unit 607, and an image generation unit 608.

Processes of the units included in the image processing apparatus 600 are performed by hardware such as an application specific integrated circuit (ASIC) incorporated in the image processing apparatus 600. The processes of the units included in the image processing apparatus 600 may be performed by hardware such as a field programmable gate array (FPGA) incorporated in the image processing apparatus 600. Alternatively, the processes may be performed by software using a memory and a central processor unit (CPU) or a graphic processor unit (GPU).

A hardware configuration of the image processing apparatus 600 in the case where the units included in the image processing apparatus 600 operate as software is described with reference to FIG. 7. FIG. 7 is a block diagram illustrating an example of a hardware configuration of the image processing apparatus 600 according to Embodiment 1. The image processing apparatus 600 is formed of a computer and the computer includes a CPU 701, a RAM 702, a ROM 703, an auxiliary storage device 704, a display unit 705, an operation unit 706, a communication unit 707, and a bus 708 as illustrated as an example in FIG. 7.

The CPU 701 controls the computer by using a program or data stored in the RAM 702 or the ROM 703 to cause the computer to function as the units included in the image processing apparatus 600 illustrated in FIG. 6. Note that the image processing apparatus 600 may include one or multiple pieces of dedicated hardware other than the CPU 701 and cause the dedicated hardware to at least partially execute the processes that are otherwise performed by the CPU 701. Examples of the dedicated hardware include the ASIC, the FPGA, a digital signal processor (DSP), and the like. The ROM 703 stores a program and the like that does not have to be changed. The RAM 702 temporarily stores a program or data supplied from the auxiliary storage device 704 or data or the like supplied from the outside via the communication unit 707. The auxiliary storage device 704 is formed of, for example, a hard disk drive or the like and stores various pieces of data such as image data and audio data.

The display unit 705 is formed of, for example, a liquid crystal display, an LED, or the like and displays a graphical user interface (GUI) or the like that allows a user to browse or operate the image processing apparatus 600. The operation unit 706 is formed of, for example, a keyboard, a mouse, a touch panel, or the like and inputs various types of instructions into the CPU 701 by receiving operations made by the user. The CPU 701 also operates as a display control unit that controls the display unit 705 and an operation control unit that controls the operation unit 706. The communication unit 707 is used for communication with an apparatus external to the image processing apparatus 600. For example, in the case where the image processing apparatus 600 is connected to the external apparatus via a wire, a communication cable is connected to the communication unit 707. In the case where the image processing apparatus 600 has a function of wirelessly communicating with the external apparatus, the communication unit 707 includes an antenna. The bus 708 transmits information by coupling the units included in the image processing apparatus 600 to one another. Although the display unit 705 and the operation unit 706 are described as units included inside the image processing apparatus 600 in Embodiment 1, at least one of the display unit 705 and the operation unit 706 may be present outside the image processing apparatus 600 as a separate apparatus.

Figure 8:
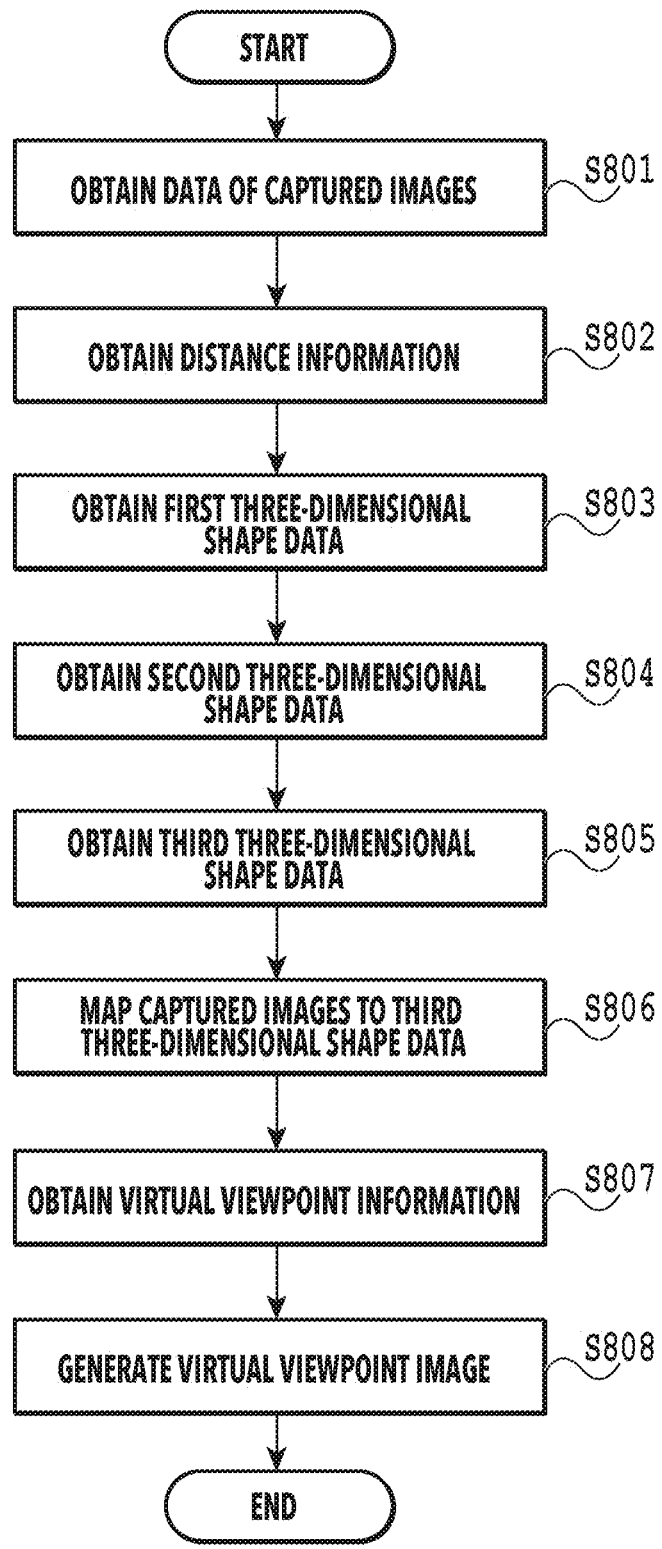
FIG. 8 is a flowchart illustrating an example of a process flow of the image processing apparatus according to Embodiment 1.

Operations of the image processing apparatus 600 and the processes of the units included in the image processing apparatus 600 and illustrated in FIG. 6 are described with reference to FIGS. 8 to 11B. FIG. 8 is a flowchart illustrating an example of a process flow of the image processing apparatus 600 according to Embodiment 1. Note that sign "S" in the following description means step. First, in S801, the image obtaining unit 601 obtains data (hereinafter, also referred to as "captured image data") of captured images obtained by image capturing with image capturing apparatuses that capture images of a surrounding of a reference point. Specifically, the image obtaining unit 601 obtains the captured image data from the auxiliary storage device 704 or from the image capturing apparatuses via the communication unit 707. For example, the image obtaining unit 601 obtains multiple pieces of captured image data obtained respectively by image capturing with multiple image capturing apparatuses that capture images of a surrounding of the reference point.

Figure 9:
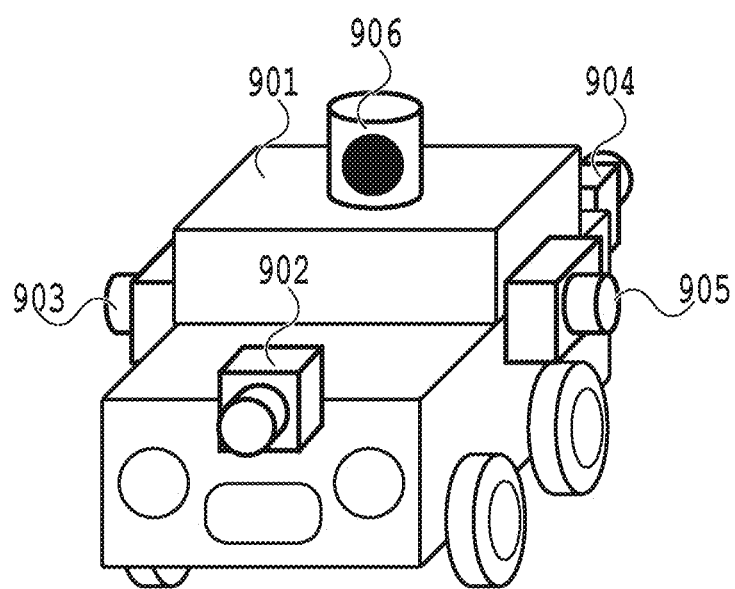
FIG. 9 is a diagram illustrating an example of arrangement of image capturing apparatuses and a ranging sensor according to Embodiment 1.

Arrangement of the image capturing apparatuses 902 to 905 is described with reference to FIG. 9. FIG. 9 is a diagram illustrating an example of arrangement of the image capturing apparatuses 902 to 905 and a ranging sensor 906 according to Embodiment 1. In the present embodiment, as illustrated in FIG. 9, the image capturing apparatuses 902 to 905 are arranged on a vehicle 901 and capture images of a surrounding of the vehicle 901 in directions outward from the vehicle 901. Moreover, fish-eye lenses are attached to the respective image capturing apparatuses 902 to 905 and a 360-degrees image of the surrounding of the vehicle 901 can be captured by using few image capturing apparatuses. The arrangement of the image capturing apparatuses 902 to 905 and the configuration of the lenses attached to the respective image capturing apparatuses 902 to 905 as illustrated in FIG. 9 are merely examples and are not limited to those described above. For example, the number of image capturing apparatuses is not limited to two or more and the image obtaining unit 601 may be a unit that obtains captured image data obtained by image capturing with one image capturing apparatus capable of capturing a wide-angle or 360-degrees image of the surrounding of the reference point.

Description is given below assuming that, in the present embodiment, four image capturing apparatuses 902 to 905 are arranged as illustrated in FIG. 9 as an example. Moreover, in the present embodiment, description is given below of a mode in which the captured image data obtained by the image obtaining unit 601 is color image data with three channels of RGB as an example. However, the captured image data may be gray image data with one channel or video data. In the case where the captured image data is the video data, the image processing apparatus 600 performs the processes by using frames captured at substantially the same timings by the respective image capturing apparatuses 902 to 905.

Moreover, for each of the image capturing apparatuses 902 to 905, the image obtaining unit 601 obtains information (hereinafter referred to as "image capturing viewpoint information") indicating an image capturing viewpoint such as a position, an orientation, and the like of the image capturing apparatus, in addition to the captured image data, from each of the image capturing apparatuses 902 to 905. In the present embodiment, the image capturing viewpoint refers to a viewpoint of each of the image capturing apparatuses 902 to 905 and the image capturing viewpoint information means information on each of the image capturing apparatuses 902 to 905. The image capturing viewpoint information includes information indicating the position, the orientation, and the like of each of the image capturing apparatuses 902 to 905 in a predetermined coordinate system. The information indicating the orientation of the image capturing apparatus herein is, for example, information indicating a direction of an optical axis of the image capturing apparatus. Moreover, the image capturing viewpoint information may include information indicating an angle of view of each of the image capturing apparatuses 902 to 905 such as a focal distance or a principal point of the image capturing apparatus, in addition to the information indicating the position, the orientation, and the like of each of the image capturing apparatuses 902 to 905. Using the image capturing viewpoint information allows pixels of the captured images and positions of objects captured in the captured images to be associated with one another. As a result, it is possible to identify a pixel in a captured image that corresponds to a specific portion of an object and obtain color information corresponding to this portion.

In the present embodiment, description is given below with a coordinate system defined such that a front-rear direction of the vehicle 901 is an x-axis, a left-right direction is a y-axis, an up-down direction is a z-axis, and a point where a center point of the vehicle 901 is projected on a ground surface is an origin of the coordinate system. Moreover, description is given below with the coordinate system defined as a right-handed coordinate system in which a traveling direction of the vehicle 901 is the positive direction of the x-axis, a leftward direction of the vehicle 901 is the positive direction of the y-axis, and the upward direction is the positive direction of the z-axis. Note that the aforementioned definitions are not limited to those described above and the coordinate system may be defined as any coordinate system. Description is given below with the aforementioned coordinate system referred to as world coordinate system. Moreover, the image capturing viewpoint information may include a distortion parameter indicating distortion in the captured image obtained by the image capturing with each of the image capturing apparatuses 902 to 905 and image capturing parameters such as f-number, shutter speed, and white balance, in addition to the aforementioned information. The image obtaining unit 601 temporarily stores the obtained captured image data and image capturing viewpoint information in the RAM 702 or the like. The image obtaining unit 601 may temporarily store each piece of captured image data in the RAM 702 or the like in association with information such as a number (hereinafter, referred to as "viewpoint number") by which the image capturing apparatus can be identified, to distinguish which image capturing apparatus has captured which piece of captured image data.

After S801, in S802, the distance obtaining unit 602 obtains distance information indicating a distance from the reference point to an object present in the vicinity of the reference point. Specifically, for example, the distance obtaining unit 602 obtains the distance information obtained by the ranging sensor 906 from the auxiliary storage device 704 or from the ranging sensor 906 via the communication unit 707. The distance information is obtained by one ranging sensor 906 installed in the vehicle 901 and illustrated as an example in FIG. 9 and the ranging sensor 906 is arranged, for example, in an upper portion of the vehicle 901 above the center point of the vehicle 901. In the present embodiment, description is given assuming that a LiDAR is used as the ranging sensor 906 and the ranging sensor 906 obtains point cloud data obtained by performing ranging of the surrounding of the vehicle 901 for 360 degrees, as the distance information. Note that the arrangement method and the number of the ranging sensor 906 illustrated in FIG. 9 are merely examples and the point cloud data may be obtained in other configurations such as a configuration in which, for example, total of four LiDARs, one in each of front, rear, left, and right portions of the vehicle 901, are arranged. Moreover, for example, the ranging sensor 906 is not limited to the LiDAR and may be any apparatus such as a RADAR or a SONAR that can obtain distance information such as the point cloud data.

Moreover, the ranging sensor 906 is not limited to an apparatus that obtains and outputs the point cloud data. For example, the ranging sensor 906 may be an apparatus that generates and outputs data (hereinafter, also referred to as "depth map data") of a depth map that indicates a distance from the reference point to an object present in the vicinity of the reference point. Note that the depth map data is generated based on captured image data obtained by image capturing with a stereo optical system such as a stereo camera. Since a method of generating the depth map data from the captured image data obtained by image capturing with the stereo optical system is well known, description thereof is omitted.

The distance obtaining unit 602 obtains information (hereinafter, referred to as "ranging sensor information") indicating the position and the orientation of the ranging sensor 906, in addition to the distance information. The ranging sensor information includes information indicating the position and the orientation of the ranging sensor 906 in the world coordinate system. In this case, the information indicating the orientation of the ranging sensor 906 is, for example, information indicating a direction of an optical axis of the ranging sensor. The distance obtaining unit 602 temporarily stores the obtained distance information and ranging sensor information in the RAM 702 or the like.

After S802, in S803, the first obtaining unit 603 generates and obtains the first three-dimensional shape data based on the distance information such as the point cloud data obtained by the distance obtaining unit 602. Specifically, in the case where the distance information is the point cloud data, for example, the first obtaining unit 603 identifies multiple planes of multiple triangular polygons or the like that have multiple points indicated by the point cloud data as vertices to generate the first three-dimensional shape data corresponding to the shape of the surface of the object. For example, the first obtaining unit 603 generates the three-dimensional shape data from the point cloud data by using such a measurement principle that the LiDAR obtains the point cloud data while changing an emission direction of beams of a scan line that is a vertical row of dots in the up-down direction. The first obtaining unit 603 can generate the three-dimensional shape data from the point cloud data in relatively-light process load by using such a principle. Specifically, the first obtaining unit 603 identifies from which position in the LiDAR a beam corresponding to each of the dots indicated by the point cloud data obtained by the distance obtaining unit 602 is emitted and thereby identifies relationships among the different dots indicated in the point cloud data. The first obtaining unit 603 generated planes (polygons) based on the thus-identified relationships.

Although the mode of obtaining the point cloud data by using the LiDAR is described above and below, similar processes can be applied to point cloud data obtained by using other ranging sensors. Moreover, the method of generating the first three-dimensional shape data is not limited to the aforementioned method based on the relationships among the dots indicated by the point cloud data and any method may be used as long as the three-dimensional shape data corresponding to the shape of the surface of the object can be generated based on the point cloud data. Furthermore, in the case where the distance information is the depth map data, for example, the first obtaining unit 603 may generate the first three-dimensional shape data as follows. First, the first obtaining unit 603 converts pixels in the depth map and depths corresponding to the respective pixels to three-dimensional space coordinates to identify multiple points in the three-dimensional space corresponding to the respective pixels in the depth map. Next, the first obtaining unit 603 identifies multiple planes having the identified points in the three-dimensional space as vertices to generate the first three-dimensional shape data corresponding to the shape of the surface of the object. Since the method of generating the three-dimensional shape data from the depth map is well known, detailed description thereof is omitted.

A method of generating the first three-dimensional shape data from the point cloud data is specifically described below. First, the order of the points indicated by the point cloud data is rearranged. Specifically, which ring and which scan line does each of the points indicated by the point cloud data obtained by using the LiDAR corresponds to are identified and the order of the points is rearranged such that the points are arranged in the order from a higher ring to a lower ring. In this case, the ring is a dot row of one circle in a circumferential direction in the beam emission by the LiDAR and the scan line is a dot row in the up-down direction in the beam emission by the LiDAR. Hereinafter, the order of the points in each ring is assumed to be rearranged to, for example, such an order that the positive direction in the x-axis is a starting point of emission and the points are arranged in the counterclockwise order in the case where the origin is viewed in the positive direction of the z-axis.

In the method of rearranging the order, a process varies depending on the order of the points in the point cloud data before the order rearrangement and a process depending on information held in the point cloud data before the order rearrangement is performed. For example, in the case where the point cloud data holds information by which the ring and the scan line at the time of obtaining can identified for each dot, the points indicated by the point cloud data is rearranged to the order described above based on this information. Meanwhile, in the case where the point cloud data holds no such information, for example, first, an elevation/depression angle and an azimuth angle of the LiDAR for each point are calculated from information indicating the position of the point in the three-dimensional space and the installation position of the LiDAR included in the ranging sensor information. Next, the position of the ring and the position of the scan line corresponding to each point are identified based on the calculated elevation/depression angle and azimuth angle and the points indicated by the point cloud data are rearranged to the aforementioned order.

Next, since the origin of the coordinates in the point cloud data obtained by using the LiDAR is based on the installation position of the LiDAR, the point cloud data after the order rearrangement is corrected such that the origin of the point cloud data after the order rearrangement is set to the origin of the world coordinate system. Description is given below assuming that the origin of the coordinates in the point cloud data is the installation position of the LiDAR. Specifically, the point cloud data after the order rearrangement is corrected by subtracting the coordinates of the origin of the point cloud data in the world coordinate system from the three-dimensional space coordinates of each point included in the point cloud data. The information indicating the position of the ranging sensor included in the ranging sensor information obtained by the distance obtaining unit 602 is used as the coordinates of the origin of the point cloud data in the world coordinate system. Lastly, multiple planes corresponding to the shape of the surface of the object are formed based on the corrected point cloud data. In this case, forming the planes means associating vertex IDs corresponding respectively to three vertices of each triangular polygon with the triangular polygon according to the dataset illustrated as an example in FIG. 3C.

Figures 10A, 10B:
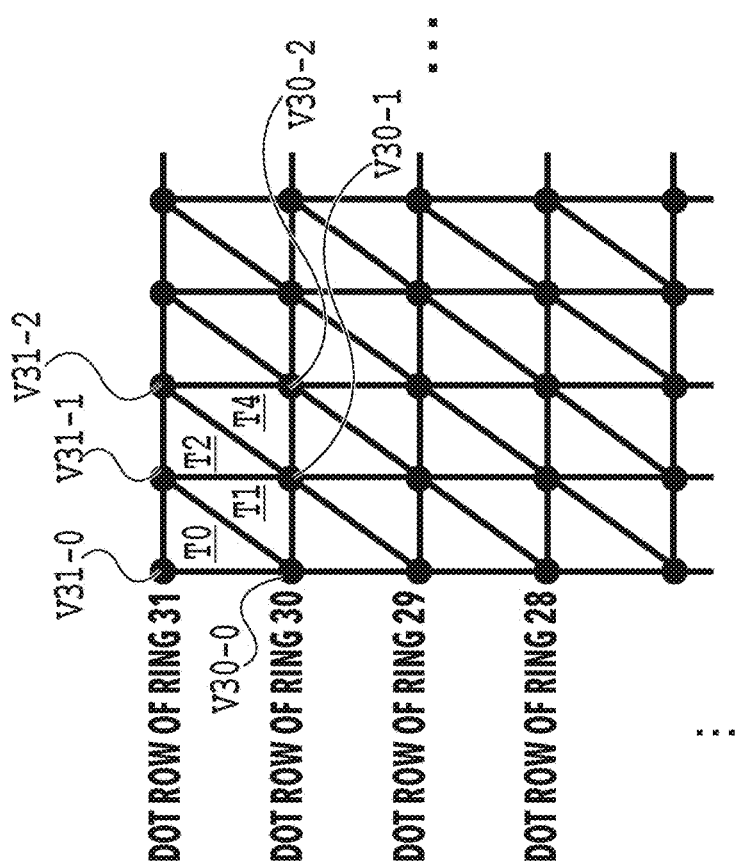
FIGS. 10A and 10B are explanatory diagrams for explaining an example of a process of forming planes corresponding to a shape of a surface of an object based on point cloud data according to Embodiment 1.

A process of forming the planes corresponding to the shape of the surface of the object based on the corrected point cloud data is described with reference to FIGS. 10A and 10B. FIGS. 10A and 10B are explanatory diagrams for explaining an example of the process of forming the planes corresponding to the shape of the surface of the object based on the point cloud data according to Embodiment 1. In FIG. 10A, the points indicated by the point cloud data after the correction are illustrated by black circles and the planes corresponding to the shape of the surface of the object are illustrated as triangles each surrounded by three line segments connecting the dots illustrated by the black circles. Each point is associated with a vertex ID (in FIG. 10A, $V_{p-q}$ (p and q are integers of 0 or higher) as an example) and each plane is associated with a triangular polygon ID (in FIG. 10A, $T_r$ (r is an integer of 0 or higher) as an example). In this case, p is a ring number and q is a scan line number. The maximum value of r is determined depending on the number of formed planes. As illustrated as an example in FIG. 10A, the points that are indicated by the point cloud data and that are already arranged in the correct order by the order rearrangement are connected in order and the multiple planes formed by the triangles having the points as vertices are thus formed. The triangular polygon ID is appended to each of the planes formed as described above and the appended triangular polygon IDs and the vertex IDs are associated with one another. A triangle list illustrated as an example in FIG. 10B is thus generated as the first three-dimensional shape data.

After S803, in S804, the second obtaining unit 604 generates the second three-dimensional shape data formed of data (hereinafter, referred to as "reference three-dimensional shape data") of a three-dimensional shape (hereinafter, referred to as "reference three-dimensional shape") of a flat plane shape or a curved plane shape. The second obtaining unit 604 may generate the second three-dimensional shape data by deforming the reference three-dimensional shape data or by combining multiple pieces of reference three-dimensional shape data. For example, the second obtaining unit 604 generates the second three-dimensional shape data in which the data of the flat plane shape 503 that is the reference three-dimensional shape data corresponding to the road surface and the data of the curved plane shape 504 that is the reference three-dimensional shape data corresponding to the distant view and the like in the environment around the vehicle 501 are combined. A distance 505 from the vehicle 501 being the reference point to the curved plane shape 504 is set based on information indicating a reference distance obtained via the communication unit 707 or from the auxiliary storage device 704. The reference distance may be a distance set in advance based on the width of the road on which the vehicle 501 being the reference point is traveling, the width of a sidewalk, or the like or any distance set in advance by the user or the like depending on a condition around the reference point such as a road condition. Moreover, although the second three-dimensional shape data is not limited to the aforementioned combination of pieces of reference three-dimensional shape data, the second three-dimensional shape data preferably includes data of a reference three-dimensional shape with z-axis direction component, that is height direction component. Including the data of the reference three-dimensional shape with height direction component in the second three-dimensional shape data can reduce distortion or tilting in an image region corresponding to an object with a certain height such as a building distant from the reference point such as the vehicle in the virtual viewpoint image. As described above, the distance from the point in the virtual space corresponding to the reference point such as the vehicle to the reference three-dimensional shape with height component is set based on the aforementioned reference distance.

Reference three-dimensional shapes with height direction component that have different shapes from the curved plane shape 504 are described with reference to FIGS. 11A and 11B. FIGS. 11A and 11B are diagrams visualizing examples of the data of the reference three-dimensional shape with height direction component according to Embodiment 1. The reference three-dimensional shape with height direction component may be, for example, a shape in which multiple flat planes perpendicular to an x-y axis of the world coordinate system are set to be arranged on the front, rear, left, and right sides of the vehicle as illustrated in FIG. 11A, instead of the curved plane surrounding the vehicle as in the curved plane shape 504. Alternatively, the reference three-dimensional shape with height direction component may be, for example, a shape in which a semi-spherical curved plane as illustrated in FIG. 11B is set. Note that the second three-dimensional shape data does not have to include the data of the reference three-dimensional shape corresponding to the road surface such as the flat plane shape 503 and the first obtaining unit 603 may generate the first three-dimensional shape data including the three-dimensional shape data corresponding to the road surface. In this case, it is possible to generate the three-dimensional shape data that accurately reflects the environment around the reference point such as the vehicle and that indicates the ground surface, the floor surface, or the like.

After S804, in S805, the third obtaining unit 605 obtains the third three-dimensional shape data in which the first three-dimensional shape data obtained by the first obtaining unit 603 and the second three-dimensional shape data obtained by the second obtaining unit 604 are integrated. Specifically, for example, the third obtaining unit 605 generates and obtains the third three-dimensional shape data holding the triangle list that is the first three-dimensional shape data and that is illustrated as an example in FIG. 10B and a triangle list corresponding to the second three-dimensional shape data and the like. Note that the third obtaining unit 605 may generate the third three-dimensional shape data that includes information such as normal information indicating a normal direction of each plane, in addition to the information in which the vertices and the planes are associated with one another such as the triangle list illustrated in FIG. 10B. Moreover, the method of integrating the first three-dimensional shape data and the second three-dimensional shape data is not limited to the aforementioned method. For example, the first three-dimensional shape data and the second three-dimensional shape data may be integrated by adding information on the vertices and the planes in the first three-dimensional shape data whose distances from the reference point are smaller than the reference distance set in the generation of the second three-dimensional shape data, to the second three-dimensional shape data.

After S805, in S806, the mapping unit 606 maps the texture image to the third three-dimensional shape data obtained by the third obtaining unit 605 by using the captured image data obtained by the image obtaining unit 601 as data of the texture image. The mapping of the texture image herein is associating the vertices of each triangular polygon and the points in the texture image with one another. A specific method of the mapping process of the texture image is described below.

First, the data of the texture image to be mapped to the third three-dimensional shape data is generated by using the captured image data. Specifically, for example, an image in which captured images are arranged from the top starting from the captured image data obtained by image capturing with an image capturing apparatus with a small viewpoint number is generated as the texture image. For example, in the case where an image size of each of four pieces of captured image data obtained by four image capturing apparatuses is Full HD (1920×1080 [pix]), an image size of the texture image is 1920×4320 [pix]. The method of generating the texture image is not limited to this. For example, the arrangement or the arrangement order of the pieces of image data forming the data of the texture image may be any arrangement or arrangement order as long as the pieces of the image data forming the data of the texture image and the pieces of image data forming the respective pieces of captured image data are associated with one another.

Moreover, in the generation of the texture image, pixel values of the texture image to be attached to a region of the third three-dimensional shape data corresponding to an invisible region or an occlusion region may be prepared in a portion of the data of the texture image to be generated. In this case, the invisible region is a region that cannot be captured by any of the image capturing apparatuses from which the captured image data is to be obtained. Moreover, the occlusion region is an image capturing region that is shielded by an object near any of all of the image capturing apparatuses from which the captured image data is obtained and that can be captured by none of the other image capturing apparatus.

As an example, description is given below assuming that the texture image to be attached to regions in the third three-dimensional shape data corresponding to the invisible region and the occlusion region are a uniform black image. In this case, for example, the pixel values of the texture image to be attached to the aforementioned regions are prepared by replacing a pixel value corresponding to a pixel at the top left corner of the texture image to be generated to a pixel value indicating black (r, g, b)=(0, 0, 0). Note that the pixel value to be prepared for the invisible region and the occlusion region does not have to be prepared by replacing the pixel value corresponding to the pixel at the aforementioned position. For example, the pixel value for the aforementioned regions may be prepared as a pixel value of a pixel located at another position. Alternatively, the configuration may be such that pixels of one line are added in a bottom row of the texture image in a vertical direction and the pixel value for the aforementioned regions is prepared as pixel values of the added pixels. Moreover, the pixel value to be prepared for the invisible region and the occlusion region may be a pixel value other than the pixel value indicating black. Furthermore, the pixel value to be prepared for the invisible region and the pixel value to be prepared for the occlusion region may vary from each other.

Next, a correspondence relationship with the captured image data is obtained for each of all vertices included in the third three-dimensional shape data. Specifically, the three-dimensional space coordinates $(X_j, Y_j, Z_j)$ of each vertex are converted to coordinates $(u_{ij}, v_{ij})$ of a pixel in the captured image data based on the image capturing viewpoint information. In this description, j is a number for identifying multiple vertices included in the third three-dimensional shape data and i is an image number for identifying multiple pieces of image data forming the captured image data. The aforementioned conversion is performed by using, for example, following Formula (2) obtained by solving following Formula (1).

$$\begin{pmatrix} X_j \\ Y_j \\ Z_j \end{pmatrix} = tR_i^{-1} \begin{pmatrix} u_{ij} - c_{xi} \\ v_{ij} - c_{yi} \\ f_i \end{pmatrix} + \begin{pmatrix} X_{cam,i} \\ Y_{cam,i} \\ Z_{cam,i} \end{pmatrix} \quad \text{Formula (1)}$$

$$\begin{pmatrix} u_{ij} - c_{xi} \\ v_{ij} - c_{yi} \\ f_i \end{pmatrix} = t^{-1} R_i + \begin{pmatrix} X_j - X_{cam,i} \\ Y_j - Y_{cam,i} \\ Z_j - Z_{cam,i} \end{pmatrix} \quad \text{Formula (2)}$$

In Formula (1), $R_i$ is a vector indicating an optical axis direction of an image number i in the world coordinate system. $(X_{cam,i}, Y_{cam,i}, Z_{cam,i})$ are coordinates in the world coordinate system that are included in the captured image viewpoint information and that indicate the position of the image capturing apparatus having obtained the image data corresponding to the image number i. Moreover, $f_i$ is a focal distance of the image capturing apparatus having obtained the image data corresponding to the image number i and $c_{xi}$ and $c_{yi}$ are a position of a principal point of the image capturing apparatus having obtained the image data corresponding to the image number i. Furthermore, t is a constant. Formula (2) is obtained by solving Formula (1) for $(u_{ij}, v_{ij})$. First, using Formula (2) enables obtaining oft. Then, using the obtained t enables obtaining of the coordinates $(u_{ij}, v_{ij})$ of the pixel in the captured image data corresponding to the three-dimensional space coordinates $(X_j, Y_j, Z_j)$ of each vertex.

Lastly, each of the triangular polygons and the texture image are associated with each other based on the coordinates of the pixels in the captured image data that correspond to the three-dimensional space coordinates of the vertices. Specifically, first, for each of the image capturing apparatuses, whether all of the vertices forming each of the triangular polygons are present in the angle of view of the image capturing apparatus is determined based on the calculated coordinates of the pixels in the captured image data. In the case where there is one image capturing apparatus with an angle of view including all vertices forming a certain triangular polygon, the captured image data obtained by this image capturing apparatus is associated with the certain triangular polygon as the data of the texture image. In the association of the texture image with the triangular polygon, the calculated coordinates of the pixels in the captured image data are converted to the coordinates of the pixels in the texture image by using the Formula (2). Meanwhile, in the case where there is no image capturing apparatus with an angle of view including all vertices forming the certain triangular polygon, the image capturing apparatus having a region corresponding to the certain triangular polygon as the image capturing region is assumed to be absent. Specifically, in this case, the coordinates of the pixels in the texture image having the aforementioned pixel value prepared for the invisible region are associated with the triangular polygon. Furthermore, in the case where there are multiple image capturing apparatuses with an angle of view including all vertices forming the certain triangular polygon, one of the image capturing apparatuses with such an angle of view is selected. Then, the captured image data obtained by the selected image capturing apparatus is associated with the certain triangular polygon as the data of the texture image. The aforementioned selection of the image capturing apparatus is performed by any method such as a method of selecting the image capturing apparatus that captures a region corresponding to the triangular polygon in high resolution. Moreover, the method employed in the case where there are multiple image capturing apparatuses with an angle of view including all vertices forming the certain triangular polygon is not limited to the method of selecting one image capturing apparatus as described above. For example, the pixel values of corresponding pixels in multiple pieces of captured image data obtained by multiple image capturing apparatuses may be blended at any ratio to generate a new texture image. Note that, in this case, the pixel values after the blending need to be reflected in the texture image.

Performing the aforementioned processes on all triangular polygons generates the third three-dimensional shape data with texture in which the texture image is mapped. Note that the aforementioned mapping process of the texture image is merely an example and the mapping process may be performed by using any method as long as the texture image can be mapped to the third three-dimensional shape data by using the captured image data.

After S806, in S807, the viewpoint obtaining unit 607 obtains information (hereinafter, referred to as "virtual viewpoint information") indicating the virtual viewpoint. In this case, the virtual viewpoint refers to a viewpoint in the case where the image processing apparatus 600 generates the virtual viewpoint image. Specifically, the virtual viewpoint information includes position information indicating the position of the virtual viewpoint in the predetermined coordinate system such as the world coordinate system and the orientation information indicating the direction of the line of sight (also referred to as "optical axis direction") like the image capturing viewpoint information. The virtual viewpoint information may include information such as information indicating the angle of view from the virtual viewpoint and information indicating the resolution of the virtual viewpoint image, in addition to the position information and the orientation information. Moreover, the virtual viewpoint information may include a distortion parameter, an image capturing parameter, or the like, in addition to the position information and the orientation information. The virtual viewpoint information is provided by, for example, an operation input by the user or the like.

After S807, in S808, the image generation unit 608 generates the virtual viewpoint image by rendering the third three-dimensional shape data with texture obtained by the mapping unit 606 based on the virtual viewpoint information obtained by the viewpoint obtaining unit 607. Since a method of generating the virtual viewpoint image by rendering the three-dimensional shape data with texture based on the specified virtual viewpoint is well known, description thereof is omitted. The image generation unit 608 outputs the data of the generated virtual viewpoint image to the auxiliary storage device 704, the display unit 705, or the like. After S808, the image processing apparatus 600 terminates the process of the flowchart illustrated in FIG. 8.

As described above, the image processing apparatus 600 maps the texture image to the third three-dimensional shape data including the first three-dimensional shape data generated based on the distance information and corresponding to the shape of the surface of the object near the reference point. The image processing apparatus 600 configured as described above can generate an accurate virtual viewpoint image in which, even in the case where there is an object near the reference point, a balance between the object near the reference point and an object distant from the reference point is achieved. Although the mode in which the image processing apparatus 600 is applied to a vehicle is described in the present embodiment, the image processing apparatus 600 is not limited to this and may also be applied to a monitoring system that monitors the inside or outside of facilities or premises, spaces in which a road, a railroad, or the like is laid, or the like.

Embodiment 2

The image processing apparatus 600 according to Embodiment 1 is an apparatus that maps the texture image to the third three-dimensional shape data in which the first three-dimensional shape data generated based on the distance information and the second three-dimensional shape data generated by the combination of pieces of reference three-dimensional shape data or the like are integrated. Particularly, the image processing apparatus 600 according to Embodiment 1 is an apparatus that sets the distance from the vehicle being the reference point to the reference three-dimensional shape with height direction component in the second three-dimensional shape data by using any predetermined distance as the reference distance. Meanwhile, an image processing apparatus according to Embodiment 2 is an apparatus that determines and sets the reference distance based on the distance information obtained from the ranging sensor.

Figure 12:
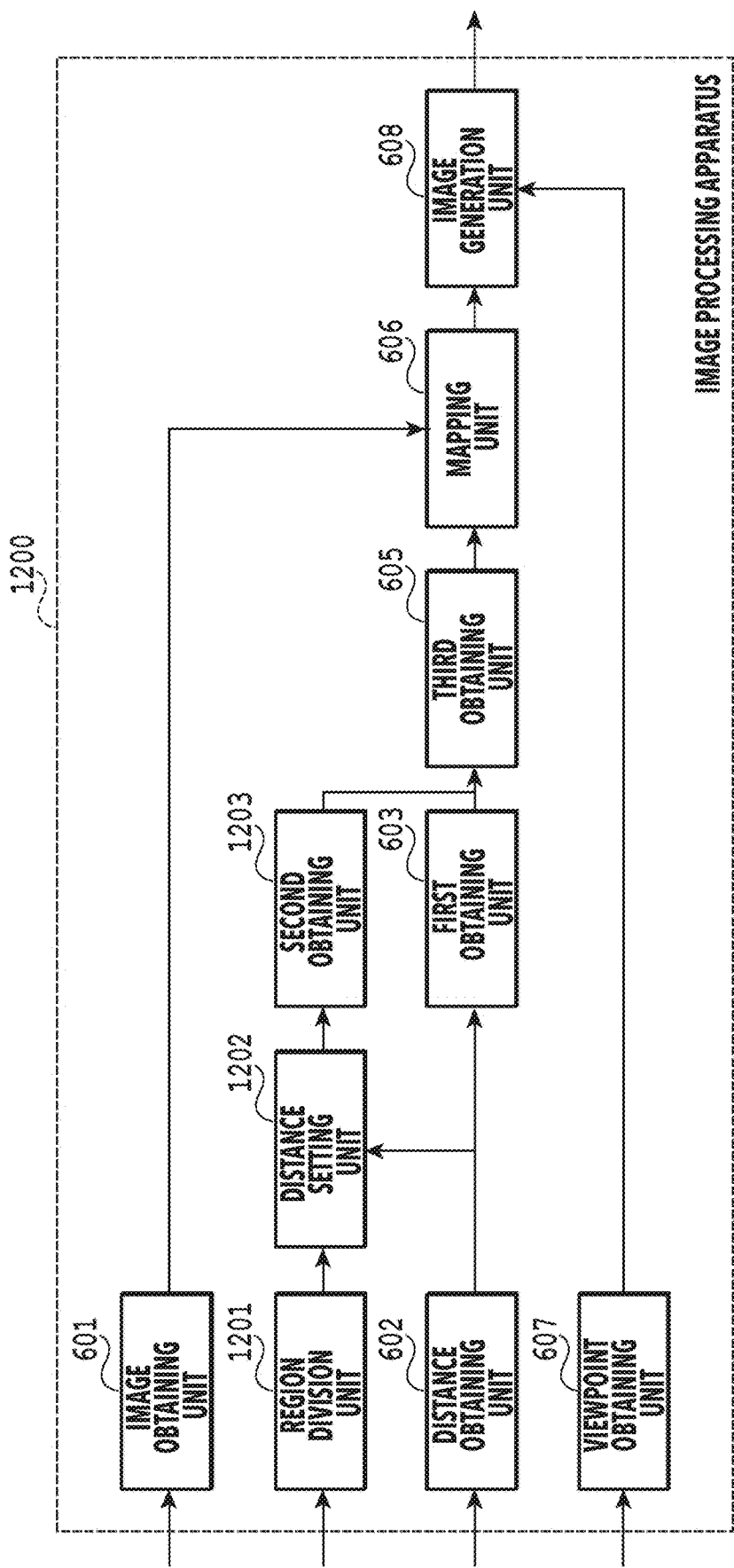
FIG. 12 is a block diagram illustrating an example of a configuration of functional blocks in an image processing apparatus according to Embodiment 2.

A configuration of the image processing apparatus 1200 according to Embodiment 2 is described with reference to FIG. 12. FIG. 12 is a block diagram illustrating an example of a configuration of functional blocks in the image processing apparatus 1200 according to Embodiment 2. The image processing apparatus 1200 includes the image obtaining unit 601, the distance obtaining unit 602, the first obtaining unit 603, a region division unit 1201, a distance setting unit 1202, a second obtaining unit 1203, the third obtaining unit 605, the mapping unit 606, the viewpoint obtaining unit 607, and the image generation unit 608. Specifically, the image processing apparatus 1200 is different from the image processing apparatus 600 according to Embodiment 1 in that the region division unit 1201 and the distance setting unit 1202 are added and the second obtaining unit 604 is changed to the second obtaining unit 1203.

In FIG. 12, configurations similar to the configurations illustrated in FIG. 6 are denoted by the identical reference numerals and description thereof is omitted below. Specifically, the image obtaining unit 601, the distance obtaining unit 602, the first obtaining unit 603, the third obtaining unit 605, the mapping unit 606, the viewpoint obtaining unit 607, and the image generation unit 608 according to Embodiment 2 are similar to the units according to Embodiment 1 and description thereof is thus omitted. Note that processes of the units included in the image processing apparatus 1200 are executed by, for example, hardware such as an ASIC or an FPGA incorporated in the image processing apparatus 1200 as in Embodiment 1. The processes may be executed by software using the hardware illustrated as an example in FIG. 7.

The region division unit 1201 divides a space around the reference point such as the vehicle into multiple regions. An example of the division of the space by the region division unit 1201 is described with reference to FIGS. 14A, 14B, 14C, 14D, and 14E. FIGS. 14A, 14B, 14C, 14D, and 14E are diagrams for explaining an example of regions (hereinafter, referred to as "division regions") subjected to division by the region division unit 1201 according to Embodiment 2. As illustrated as an example in FIGS. 14A, 14B, 14C, and 14D, the region division unit 1201 divides, for example, the space in which the vehicle is present into four division regions 1401 to 1404. The division region 1401 is a region in front of the vehicle and is a region in which all x coordinates are positive and the division region 1404 is a region behind the vehicle and is a region in which all x coordinates are negative. Moreover, the division region 1402 is a region to the left of the vehicle and is a region in which all y coordinates are positive and the division region 1403 is a region to the right of the vehicle and is a region in which all y coordinates are negative.

The distance setting unit 1202 sets the distance from the position in the virtual space corresponding to the reference point such as the vehicle to the three-dimensional shape with height direction component included in the second three-dimensional shape data. For example, the distance setting unit 1202 determines and sets the distance from the position corresponding to the reference point to the three-dimensional shape with height direction component for each of the division regions. Specifically, the distance setting unit 1202 determines the distance from the position corresponding to the reference point to the three-dimensional shape with height direction component for each of the division regions set by the region division unit 1201, based on distance information such as the point cloud data obtained by the distance obtaining unit 602.

To be more specific, the distance setting unit 1202 calculates a statistical value of a distance from the reference point to an object based on the distance information and sets the distance from the position corresponding to the reference point to the three-dimensional shape with height direction component based on the calculated statistical value. For example, in the case where the distance information is the point cloud data, the distance setting unit 1202 first calculates a distance from the vehicle to each of points included in the target division region among the multiple points indicated by the point cloud data. Then, the distance setting unit 1202 calculates a statistical value such as a median value or an average value of the calculated distances and sets the calculated statistical value as the reference distance from the reference point to the reference position in the target division region. In FIGS. 14A, 14B, 14C, 14D, and 14E, reference positions 1405 to 1408 each arranged on a line of intersection between an xy plane passing the origin and a plane that is orthogonal to the xy plane and that bisects the corresponding division region are illustrated as the reference positions of the respective division regions as an example. A distance from the origin to each reference position is the aforementioned reference distance. The straight line on which the reference position is arranged in each division region is set, for example, in the aforementioned division.

The second obtaining unit 1203 defines data of the reference three-dimensional shape with height direction component that is in contact with a floor surface based on the reference distance set for each division region and generates the second three-dimensional shape data. For example, the reference three-dimensional shape with height direction component is defined by a combination of multiple flat plane shapes that pass the reference positions in the respective division regions and that are each orthogonal to the x-axis or the y-axis like solid lines 1409 illustrated in FIG. 14E. Moreover, for example, the reference three-dimensional shape with height direction component may be defined by a curved plane that passes the reference positions in the respective division regions and smoothly connects the reference positions to one another like a broken line 1410 illustrated in FIG. 14E.

The environment around the vehicle includes various environments such as a road with small width in which passing-by of vehicles is difficult and a road with large width having two lanes on one side. Accordingly, the distance from the vehicle being the reference point to an object such as a building present around the road varies depending on the environment in which the vehicle is present. Moreover, in the world coordinate system in which the position of the center of the vehicle is defined as the origin as described in Embodiment 1, the distance from the vehicle to the object such as the building in the negative direction of the y-axis sometimes varies from that in the positive direction of the y-axis, depending on the position of the vehicle on the road in the y-axis direction. The image processing apparatus 1200 according to Embodiment 2 can set the reference distance for each division region by using the distance information in the generation of the second three-dimensional shape data also in the aforementioned case. Accordingly, the environment around the vehicle can be accurately reflected. As a result, the image processing apparatus 1200 can generate an accurate virtual viewpoint image in which, even in the case where there is an object near the reference point, a balance between the object near the reference point and an object distant from the reference point is achieved, irrespective of the environment around the reference point such as the vehicle.

Figure 13:
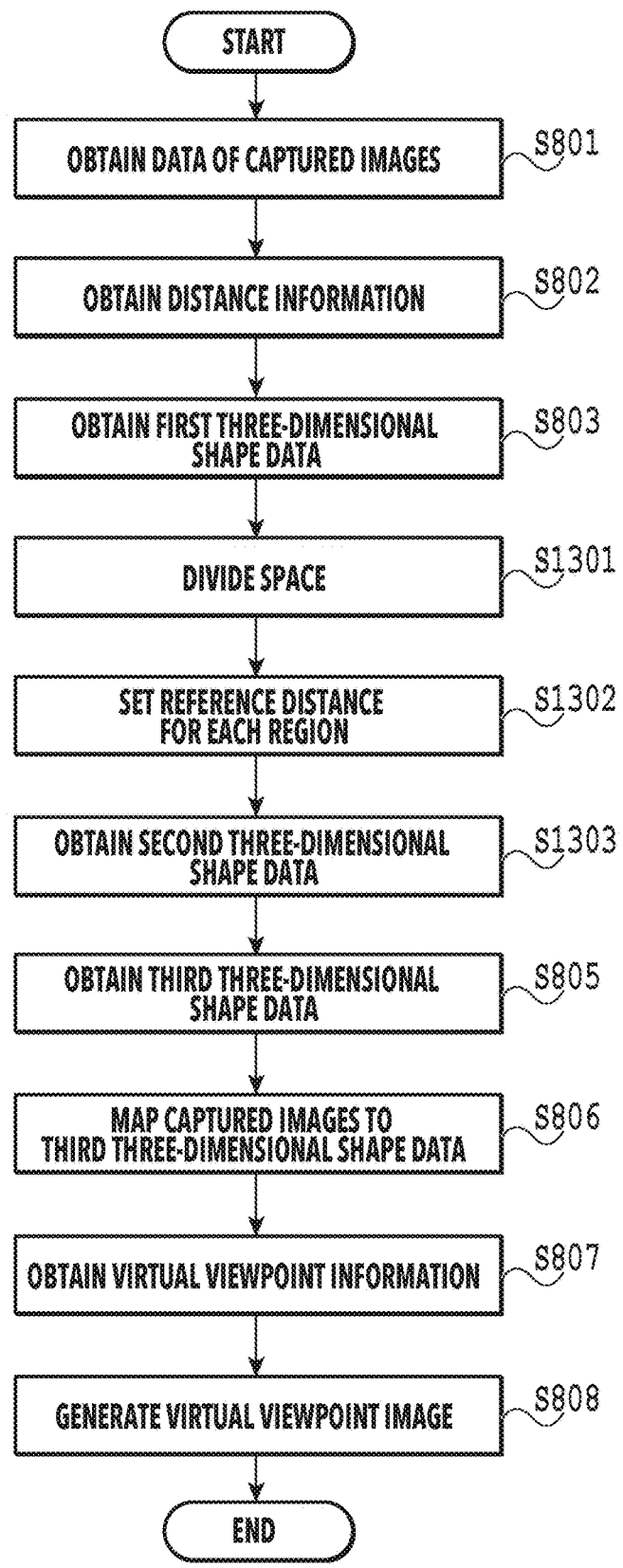
FIG. 13 is a flowchart illustrating an example of a process flow of the image processing apparatus according to Embodiment 2.
Figure 14A:
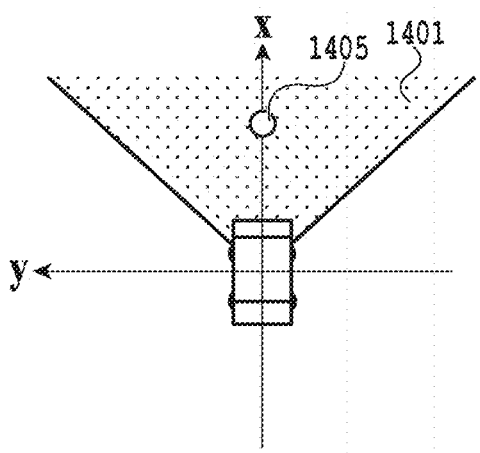
FIGS. 14A, 14B, 14C, and 14D are diagrams for explaining an example of regions subjected to division by a region division unit according to Embodiment 2
Figure 14B:
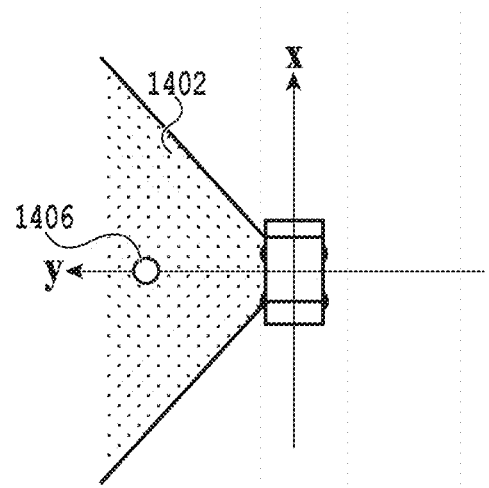
Figure 14C:
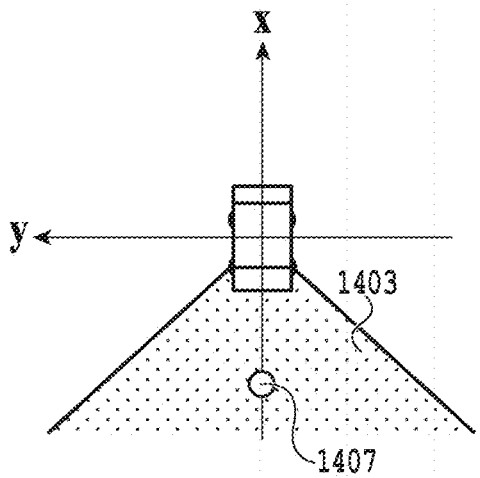
Figure 14D:
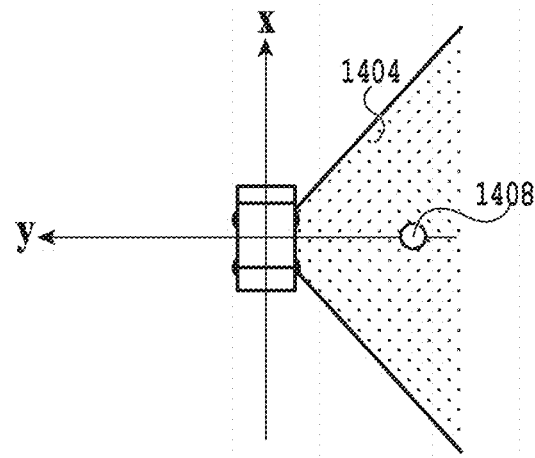
Figure 14E:
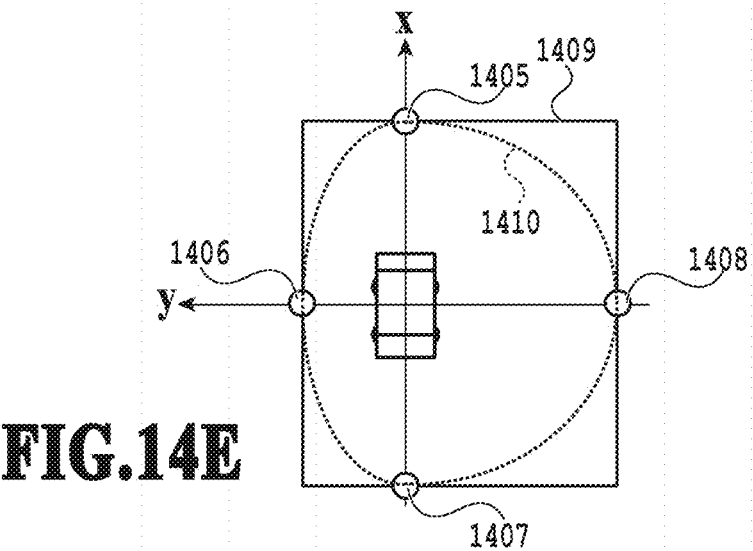
FIG. 14E is a diagram for explaining an example of a reference three-dimensional shape according to Embodiment 2.

Operations of the image processing apparatus 1200 are described with reference to FIG. 13. FIG. 13 is a flowchart illustrating an example of a process flow of the image processing apparatus 1200 according to Embodiment 2. In FIG. 13, processes similar to the processes illustrated in FIG. 8 are denoted by the identical reference numerals and description thereof is omitted below. First, the image processing apparatus 1200 execute the processes of S801 to S803. After S803, in S1301, the region division unit 1201 divides the space around the reference point into multiple regions. The number of division regions into which the region division unit 1201 divides the space is, for example, determined in advance and the region division unit 1201 obtains information (hereinafter referred to as "division information") indicating the number of division regions via the communication unit 707 or from the auxiliary storage device 704.

A specific example of the division process is described below assuming that the region division unit 1201 divides the space around the reference point into four division regions 1401 to 1404 illustrated as an example in FIGS. 14A, 14B, 14C, and 14D. First, the region division unit 1201 divides 360 degrees corresponding to the entire circumference of the vehicle by the number indicated by the division information and calculates an angle to be assigned to each division region. In the case of FIGS. 14A, 14B, 14C, and 14D, 360 degrees is divided by 4 and the angle to be assigned to each division region is thus 90 degrees. Next, a reference direction vector for determining the straight line on which the reference position is to be arranged in each division region is calculated for each division region. In the present embodiment, the reference direction vectors are determined sequentially in the counterclockwise direction in the case where the origin is viewed in the positive direction of the z-axis, with a direction of the point where the x coordinate is positive and the y coordinate is 0 set as the first reference direction vector. For example, the reference direction vectors are determined by using following Formula (3).

$$(x_i, y_i) = (\cos(\theta \times (i-1)), \sin(\theta \times (i-1))) \quad \text{Formula (3)}$$

In this Formula, $\theta$ is an angle assigned to each division region and i is a constant indicating what number the reference direction vector is. In the case of FIGS. 14A, 14B, 14C, and 14D, $\theta$ is 90 degrees and i is one of values from 1 to 4. According to Formula (3), the reference direction vectors are calculated in the order of (1, 0), (0, 1), (−1, 0), and (0, −1).

Lastly, the division regions are defined based on the calculated reference direction vectors. For example, each division region is defined by defining boundaries of the division region by vectors in two directions that are a start direction vector and an end direction vector (hereinafter, referred to as "start vector" and "end vector"). Specifically, for example, first, there is calculated an average vector of the reference direction vector of the division region to be processed and the first reference direction vector detected in the clockwise direction in the case where the origin is viewed in the positive direction of the z axis, from the reference direction vector of the division region to be processed. Next, the average vector is normalized and the normalized average vector is defined as the start vector of the division region to be processed. For the end vector, first, there is calculated an average vector of the reference direction vector of the division region to be processed and the first reference direction vector detected in the counterclockwise direction in the case where the origin is viewed in the positive direction of the z axis, from the reference direction vector of the division region to be processed. Next, the average vector is normalized and the normalized average vector is defined as the end vector of the division region to be processed. In the case of FIGS. 14A, 14B, 14C, and 14D, the start vectors of the respective division regions are $(1/\sqrt{2}, -1/\sqrt{2})$, $(1/\sqrt{2}, 1/\sqrt{2})$, $(-1/\sqrt{2}, 1/\sqrt{2})$, and $(-1/\sqrt{2}, -1/\sqrt{2})$. Moreover, the end vectors of the respective division regions are $(1/\sqrt{2}, 1/\sqrt{2})$, $(-1/\sqrt{2}, 1/\sqrt{2})$, $(-1/\sqrt{2}, -1/\sqrt{2})$, and $(1/\sqrt{2}, -1/\sqrt{2})$.

Although the case where the number of division regions is four is described in the present embodiment, the number of division regions is not limited to four and may be any division number. Moreover, although the division regions are defined such that the angles of the respective division regions at the reference points are equal in the present embodiment, the angles are not limited to such angles. For example, an angle of the division regions in the traveling direction of the vehicle and an angle of the other division regions may be defined to vary from each other or similar definitions may be made to define the angles of the division regions depending on the directions. Moreover, although the boundaries of each division region are defined by using vectors in two directions in the present embodiment, the method of defining the division region is not limited to this. For example, the division regions may be defined by any method as long as the division regions can be defined such as a method in which a set of section regions obtained by sectioning the space around the reference point at constant fine intervals is prepared and identification information of the section regions corresponding to each division region is set to be held.

After S1301, in S1302, the distance setting unit 1202 calculates the reference distance for each division region subjected to the division by the region division unit 1201, based on the distance information obtained by the distance obtaining unit 602. A method of calculating the reference distance in the case where the distance information is the point cloud data is described below as an example. First, the distance setting unit 1202 calculates a direction vector that is obtained by projecting a vector from the origin of the world coordinate system to each point indicated by the point cloud data on the xy plane. Next, in the division region to be processed, one or more points corresponding to the direction vectors present between the start vector and the end vector described above are identified. Then, for each of the identified points, the distance from the reference point such as the vehicle, that is the origin of the world coordinate system, to the identified point is calculated based on the three-dimensional space coordinates of the identified point. Lastly, the statistical value such as the median value, the maximum value, or the average value of the distances calculated for the respective identified points is calculated and is set as the reference distance in the division region to be processed. Alternatively, only the distances corresponding to some of the multiple identified points may be used in the calculation of the statistical values to be set as the reference distance. Specifically, the distances corresponding to some of the multiple identified points may be used by, for example, excluding in advance points present in a predetermined range near the vehicle in which an object can be expressed in the first three-dimensional shape data or by performing a similar operation.

After S1302, in S1303, the second obtaining unit 1203 generates the data of the reference three-dimensional shape with height direction component, based on the reference distance for each division region obtained by the distance setting unit 1202. The second obtaining unit 1203 further generates the second three-dimensional shape data including the generated reference three-dimensional shape data. In the case where the data of the reference three-dimensional shape formed of multiple flat plane shapes is to be used as the second three-dimensional shape data, the second obtaining unit 1203 generates the reference three-dimensional shape data in which a flat plane perpendicular to the reference direction vector is arranged at the position of the reference distance in each division region. The height of this flat plane is set to, for example, such height that an object such as a building around the vehicle can be covered with the flat plane. Note that a value to be set as the height of the flat plane may be a predetermined value obtained via the communication unit 707 or from the auxiliary storage device 704 or a value calculated based on the point cloud data. The value to be set as the height of the flat plane based on the point cloud data is calculated as follows for example. In the case where the distance setting unit 1202 calculates the reference distance for each division region, the distance setting unit 1202 calculates a statistical value such as an average value, a median value, or a maximum value of z coordinate values of the aforementioned one or more identified points in the three-dimensional space coordinates and sets the calculated statistical value as the height of the flat plane. The height of the flat plane may be the identical among all division regions or vary among the division regions.

The width of each flat plane is set based on positions where the target flat plane intersects flat planes arranged respectively in two division regions that are different from each other and that are arranged adjacent to the division region in which the target flat plane is arranged. All perpendicular flat planes arranged in the respective division regions are integrated and three-dimensional shape data corresponding to the integrated multiple flat planes is generated as the reference three-dimensional shape data. Moreover, the second three-dimensional shape data including the generated reference three-dimensional shape data is generated. In the aforementioned integration, overlapping regions in the planes corresponding to the division regions different from each other may be removed or not removed. In the case where the overlapping regions are to be removed, the region closer to the reference point such as the vehicle out of the overlapping regions is retained and the region that is located farther than the closer region is and that is included in the plane which cannot be viewed from the reference point due to presence of the plane including the closer region is removed.

In the case where the data of the reference three-dimensional shape formed of the curved plane shape is used as the second three-dimensional shape data, first, a position away from the reference point by the reference distance in the direction of the reference direction vector is calculated for each division region and the calculated position is set as the reference position of the division region. Next, curves smoothly connecting the reference positions of the respective division regions on the xy plane are calculated. The calculation of each curve may be performed by assigning a function expressing a curve such as a quadratic function or a polynomial function connecting two reference positions. Instead of assigning the function expressing the curve, the configuration may be such that positions of points sectioning a space between the reference positions at fixed intervals for each coordinate axis are calculated and, for example, the reference positions and the calculated positions of the points are linearly connected. Lastly, a plane that extends in the height direction along the curves is defined. In this case, such a plane that the area of a plane parallel to the xy plane surrounded by the curves increases as the height increases or such a plane that this area decreases as the height increases may be defined. The plane extending in the height direction along the curves may be defined as any plane according to a shape desired to be expressed as the environment around the vehicle. After S1303, the image processing apparatus 1200 executes the processes of S805 to S808 and, after S808, terminates the process of the flowchart illustrated in FIG. 13.

As described above, the image processing apparatus 1200 sets the reference distance based on the distance information and generates the second three-dimensional shape data based on the set reference distance. Moreover, the image processing apparatus 1200 maps the texture image to the third three-dimensional shape data in which the generated first three-dimensional shape data and the generated second three-dimensional shape data are integrated. The image processing apparatus 1200 configured as described above can generate an accurate virtual viewpoint image in which, even in the case where there is an object near the reference point, a balance between the object near the reference point and an object distant from the reference point is achieved. Although the mode in which the image processing apparatus 1200 is applied to a vehicle is described in the present embodiment, the image processing apparatus 1200 is not limited to this and may also be applied to a monitoring system that monitors the inside or the outside of facilities or premises, spaces in which a road, a railroad, or the like is laid, or the like.

Embodiment 3

The image processing apparatuses 600 and 1200 according to Embodiments 1 and 2 are apparatuses that generate the third three-dimensional shape data in which the first three-dimensional shape data generated based on the distance information and the second three-dimensional shape data generated based on the combination of pieces of reference three-dimensional shape data and the like are integrated. The image processing apparatuses 600 and 1200 according to Embodiments 1 and 2 are apparatuses that further map the texture image to the third three-dimensional shape data. Moreover, the image processing apparatus 1200 according to Embodiment 2 is an apparatus that sets the reference distance based on the distance information and generates the second three-dimensional shape data based on the set reference distance. Meanwhile, an image processing apparatus according to Embodiment 3 is an apparatus that removes an unnecessary plane among the planes formed based on the distance information in the generated first three-dimensional shape data and generates the third three-dimensional shape data by integrating the first three-dimensional shape data after the removal.

Figure 15:
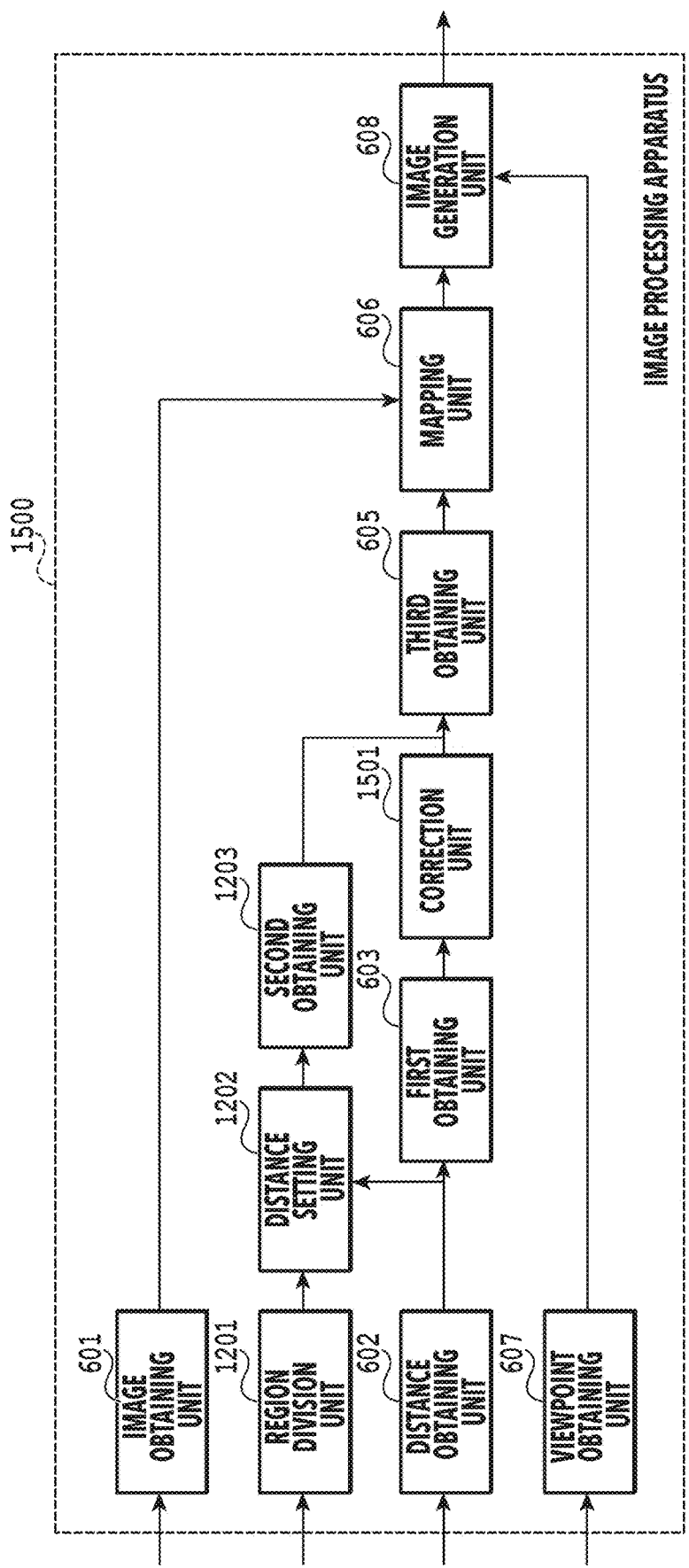
FIG. 15 is a block diagram illustrating an example of a configuration of functional blocks in an image processing apparatus according to Embodiment 3.

A configuration of the image processing apparatus 1500 according to Embodiment 3 is described with reference to FIG. 15. FIG. 15 is a block diagram illustrating an example of functional blocks of the image processing apparatus 1500 according to Embodiment 3. The image processing apparatus 1500 includes the image obtaining unit 601, the distance obtaining unit 602, the first obtaining unit 603, the region division unit 1201, the distance setting unit 1202, the second obtaining unit 1203, the third obtaining unit 605, the mapping unit 606, the viewpoint obtaining unit 607, and the image generation unit 608. Moreover, the image processing apparatus 1500 includes a correction unit 1501 in addition to the aforementioned configuration. Specifically, the image processing apparatus 1500 is different from the image processing apparatus 1200 according to Embodiment 2 in that the correction unit 1501 is added. Note that, in the configuration of the image processing apparatus 1500, the region division unit 1201, the distance setting unit 1202, and the second obtaining unit 1203 may be replaced by the second obtaining unit 604 included in the image processing apparatus 600 according to Embodiment 1. Specifically, the image processing apparatus 1500 may be different from the image processing apparatus 600 according to Embodiment 1 in that the correction unit 1501 is added.

In FIG. 15, configurations similar to the configurations illustrated FIG. 6 or 12 are denoted by the identical reference numerals and description thereof is omitted below. Specifically, the image obtaining unit 601, the distance obtaining unit 602, the first obtaining unit 603, the third obtaining unit 605, the mapping unit 606, the viewpoint obtaining unit 607, and the image generation unit 608 according to Embodiment 3 are similar to the units according to Embodiment 1 or 2 and description thereof is thus omitted. Moreover, the region division unit 1201, the distance setting unit 1202, and the second obtaining unit 1203 according to Embodiment 3 are similar to the units according to Embodiment 2 and description thereof is thus omitted. Note that processes of the units included in the image processing apparatus 1500 are executed by, for example, hardware such as an ASIC or an FPGA incorporated in the image processing apparatus 1500 as in Embodiment 1 or 2. The processes may be executed by software using the hardware illustrated as an example in FIG. 7.

As described in Embodiment 1, the first obtaining unit 603 forms the multiple planes corresponding to the surface of the object near the reference point such as the vehicle based on the distance information and generates the three-dimensional shape data indicating the formed multiple planes as the first three-dimensional shape data. As described as an example in Embodiment 1, the planes are formed by using such a measurement principle that the LiDAR obtains the point cloud data while changing the emission direction of the beams of the scan line. Specifically, the first obtaining unit 603 performs the rearrangement of the point cloud data such that the condition of the emission of the beams from the LiDAR is reflected, and forms the planes by connecting the adjacent points among the multiple points indicated by the point cloud data after the rearrangement. In this case, there is sometimes formed a plane that has, as vertices, a point corresponding to a surface of an object near the reference point and a point corresponding to a surface of another object behind the object near the reference point as viewed from the reference point.

Figures 17A, 17B:
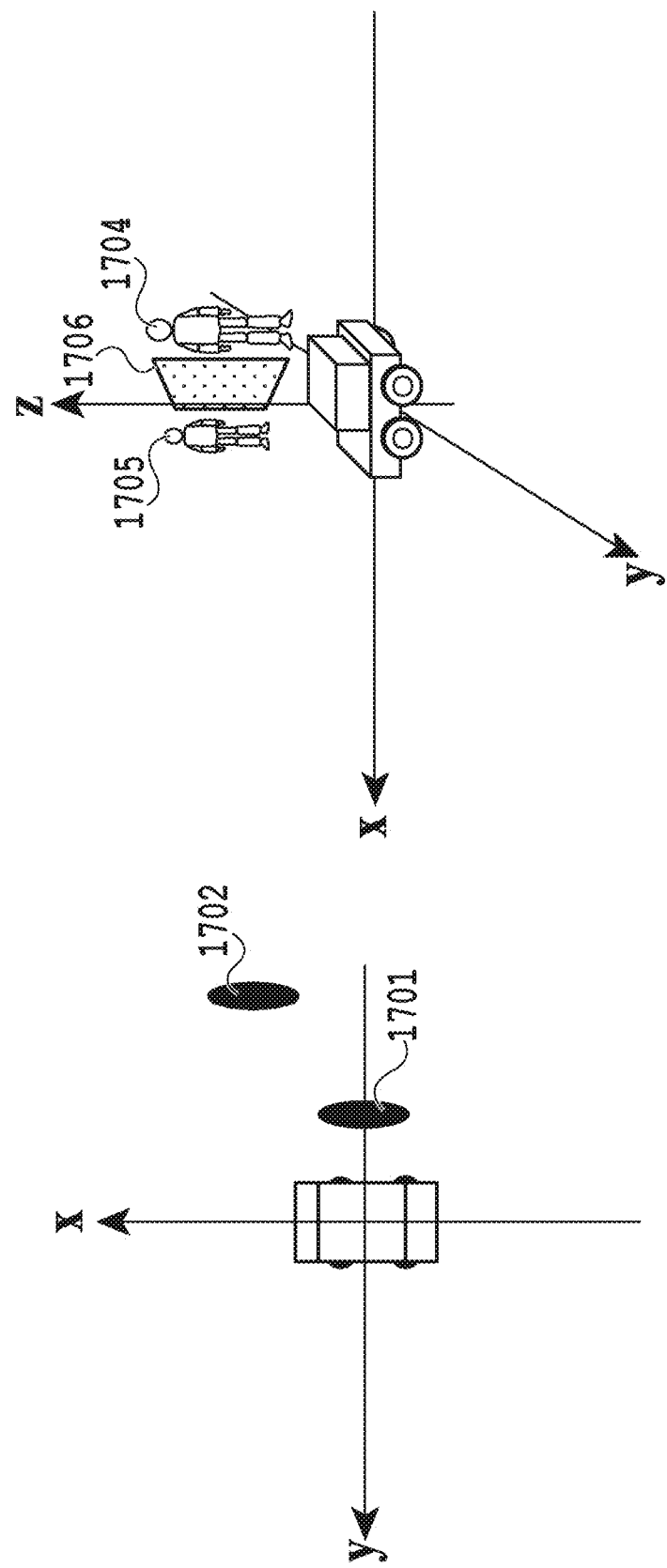
FIG. 17A is a diagram illustrating an example of a positional relationship between the reference point and the objects according to Embodiment 3 and FIG. 17B is a diagram visualizing a shape corresponding to the vehicle in a three-dimensional virtual space and pieces of three-dimensional shape data corresponding to persons according to Embodiment 3.

The plane that has, as vertices, a point corresponding to a surface of an object near the reference point and a point corresponding to a surface of another object behind the object near the reference point as viewed from the reference point is described with reference to FIGS. 17A and 17B. FIG. 17A is a diagram illustrating an example of a positional relationship between a vehicle that is the reference point and persons 1701 and 1702 that are the objects as viewed from a position where the z coordinate is positive, in a direction toward the origin. Moreover, FIG. 17B is a diagram visualizing a shape corresponding to the vehicle in the three-dimensional virtual space and pieces of three-dimensional shape data 1704 and 1705 corresponding to the persons 1701 and 1702. Description is given below of an example in which two persons of the persons 1701 and 1702 are present to the right of the vehicle at different distances from the vehicle as illustrated in FIG. 17A.

In FIG. 17A, the persons 1701 and 1702 are adjacent to each other as viewed from the LiDAR and the person 1702 is farther than the person 1701 as viewed from the vehicle. In the case where the planes are formed by connecting the points indicated by the point cloud data as in the first obtaining unit 603 according to Embodiment 1, a plane 1706 is formed between the three-dimensional shape data 1704 corresponding to the person 1701 and the three-dimensional shape data 1705 corresponding to the person 1702. The plane 1706 is a plane that originally does not correspond to the surface of the object and is a plane unnecessary for the first three-dimensional shape data. In the case where the first three-dimensional shape data includes three-dimensional shape data corresponding to an unnecessary plane, the virtual viewpoint image is sometimes generated based on the third three-dimensional shape data with texture in which the texture image is mapped to the three-dimensional shape data corresponding to the unnecessary plane. In this case, the texture is mapped to the unnecessary plane in a distorted state and the image quality decreases in an image region corresponding to this plane in the virtual viewpoint image. In order to counter this image quality decrease, the image processing apparatus 1500 according to Embodiment 3 causes the first obtaining unit 603 to delete the three-dimensional shape data corresponding to the unnecessary plane 1706 from the first three-dimensional shape data.

Figure 16:
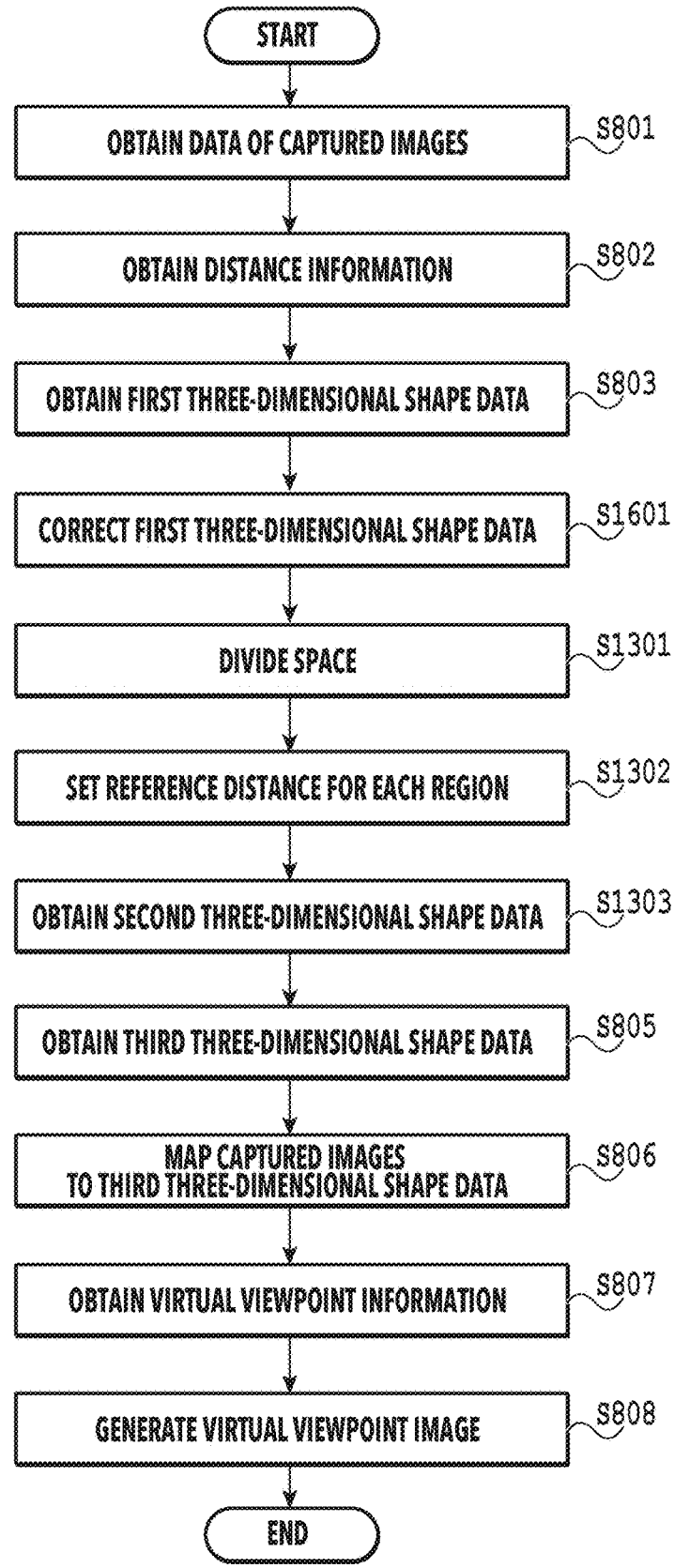
FIG. 16 is a flowchart illustrating an example of a process flow of the image processing apparatus according to Embodiment 3.

Operations of the image processing apparatus 1500 are described below with reference to FIG. 16. FIG. 16 is a flowchart illustrating an example of a process flow of the image processing apparatus 1500 according to Embodiment 3. In FIG. 16, processes similar to the processes illustrated in FIG. 8 or 13 are denoted by the identical reference numerals and description thereof is omitted below. First, the image processing apparatus 1500 executes the processes of S801 to S803. After S803, in S1601, the correction unit 1501 corrects the first three-dimensional shape data obtained by the first obtaining unit 603. Specifically, the correction unit 1501 corrects the first three-dimensional shape data by deleting the three-dimensional shape data corresponding to the unnecessary plane from the first three-dimensional shape data obtained by the first obtaining unit 603.

As described above, the first obtaining unit 603 forms the planes according to, for example, the order of emission of the beams in the LiDAR. Accordingly, the first three-dimensional shape data generated by the first obtaining unit 603 includes the three-dimensional shape data corresponding to the plane connecting the front object and the object behind the front object. As described above, this plane does not correspond to the surface of the object. Accordingly, no point indicated by the point cloud data is present on this plane. Thus, the plane is a plane elongating in a direction (hereinafter, referred to as "depth direction") in which the xy plane spreads, which cannot be seen in the planes corresponding to the surface of the original object.

For example, the correction unit 1501 compares a predetermined length threshold and the length, in the depth direction, of each of the multiple planes indicated by the first three-dimensional shape data. In this case, for example, the length threshold is set to an upper limit value of the length of a formable plane in the depth direction that is calculated based on specifications of the LiDAR and the like. For example, the correction unit 1501 calculates the distances among the vertices in each of the triangular polygons included in the first three-dimensional shape data and determines whether each of the calculated distances is larger than the aforementioned length threshold. The triangular polygon in which the calculated distance is larger than the length threshold as a result of the determination is assumed to be the three-dimensional shape data corresponding to the unnecessary plane and the data indicating this triangular polygon is deleted from the three-dimensional shape data.

The aforementioned length threshold may be determined for each triangular polygon. For example, in the point cloud data obtained by the LiDAR, the distance between the points adjacent to each other in the same ring is small and the distance between the points adjacent to each other in the scan line is large. Moreover, in the point cloud data obtained by the LiDAR, the larger the distance from the LiDAR is, the larger the distance between the points adjacent to each other on the floor surface indicated by the point cloud data in the scan line is. Since the LiDAR has the aforementioned characteristics, the following problems may occur in the case where the three-dimensional shape data corresponding to a plane is deleted based on a fixed length threshold from the first three-dimensional shape data generated based on the point cloud data obtained by the LiDAR. For example, in the case where the length threshold is too small, the three-dimensional shape data corresponding to a plane that should not be removed, that is the surface of the object or the correct plane such as the road surface may be deleted. Meanwhile, in the case where the threshold is too large, the three-dimensional shape data corresponding to a plane that should be removed, that is the unnecessary plane corresponding to none of the surface of the object, the road surface, and the like may not be sufficiently deleted. Accordingly, the length threshold is preferably appropriately changed for each triangular polygon.

Figure 18:
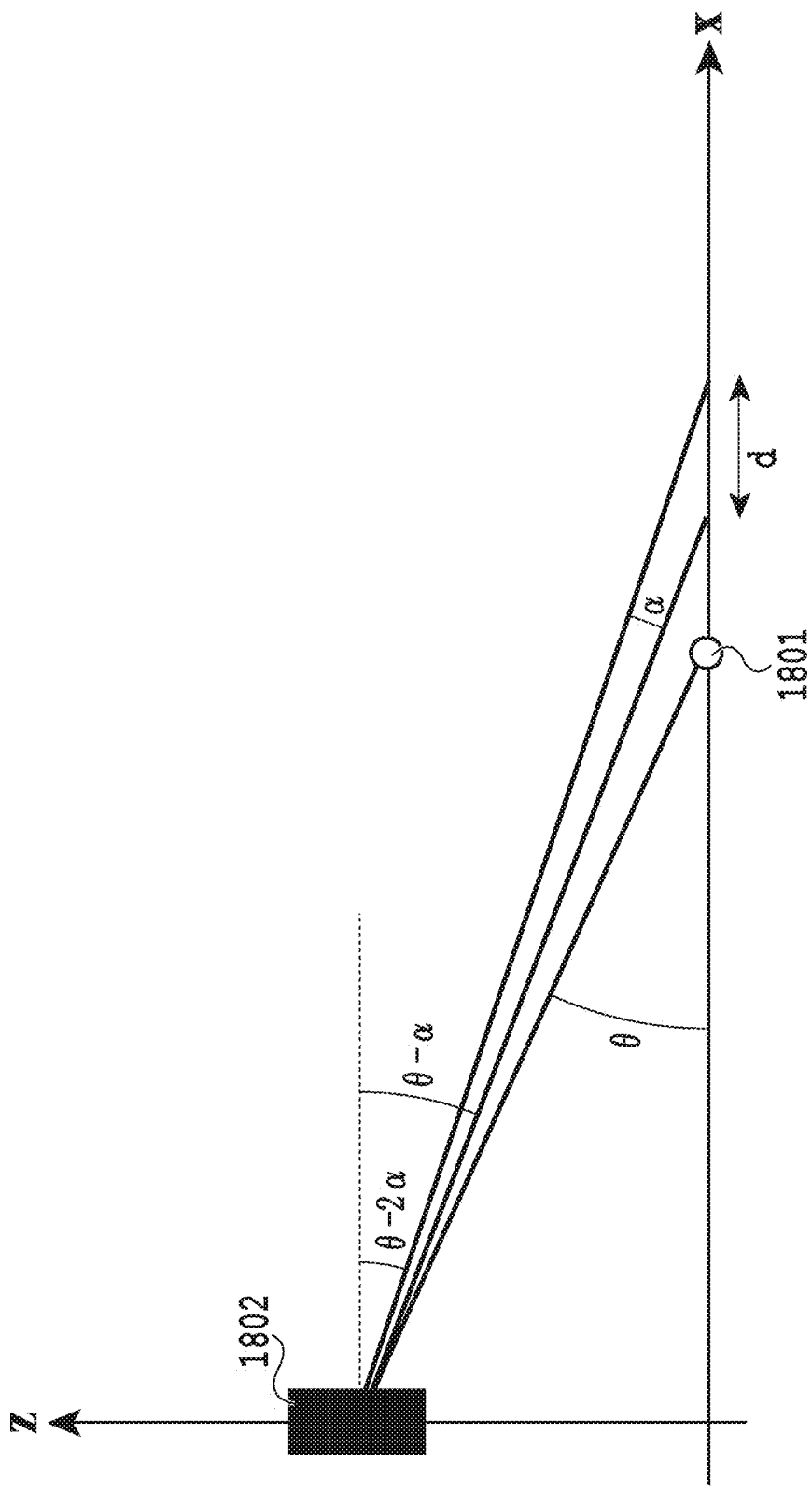
FIG. 18 is an explanatory diagram for explaining an example of a method of calculating a length threshold according to Embodiment 3.

A method of calculating the aforementioned length threshold is described with reference to FIG. 18. FIG. 18 is an explanatory diagram for explaining an example of the method of calculating the length threshold according to Embodiment 3. As illustrated in FIG. 18, first, there are obtained three-dimensional coordinates of a vertex 1801 corresponding to a certain triangular polygon and an angle θ formed between the xy plane and a straight line connecting a position of a LiDAR 1802 and the vertex 1801. Next, an emission angle difference a between beams adjacent to each other in a scan line determined from the specifications of the LiDAR and the like is used to calculate a distance d between points in the case where beams of angles of θ-α and θ-2α from the LiDAR is present in the scan line, and the distance d is set as the length threshold. Then, the distances between each vertex and the other vertices corresponding to this triangular polygon are calculated and the maximum value of the distance is calculated. Lastly, the triangular polygon in which the maximum value of the distance is equal to or larger than the determined length threshold is assumed to be unnecessary and data corresponding to this triangular polygon is deleted from the first three-dimensional shape data. Note that the aforementioned process is performed for each and every triangular polygon included in the first three-dimensional shape data obtained by the first obtaining unit 603. Moreover, the distances between each vertex and the other vertices corresponding to each triangular polygon are calculated based on the three-dimensional space coordinates of the vertices.

The aforementioned process is performed for each and every triangular polygon and the three-dimensional shape data corresponding to the unnecessary plane is deleted from the first three-dimensional shape data obtained by the first obtaining unit 603 to correct the first three-dimensional shape data. Although the mode in which the correction unit 1501 determines whether a plane is the unnecessary plane or not based on the depth direction length of the formable plane calculated based on the specifications of the LiDAR and the like is described in the present embodiment, the determination of whether a plane is the unnecessary plane or not is not limited to this method. For example, the determination of whether a plane is the unnecessary plane or not may be performed by assuming the thickness, in the depth direction, of an object such as the person or the vehicle that may be present around the reference point such as the vehicle in advance and causing the correction unit 1501 to determine whether the length of the plane to be processed in the depth direction is larger than the assumed thickness or not. In this case, a fixed length threshold irrespective of the triangular polygons may be set for the multiple triangular polygons included in the first three-dimensional shape data. In this case, in order to prevent removal of a plane that should not be removed, for example, the correction unit 1501 first determines whether the triangular polygon to be processed corresponds to the floor surface or not. Then, in the case where the triangular polygon does not correspond to the floor surface, the correction unit 1501 determines whether to remove the plane or not by comparing the length threshold and the distances among the vertices of the triangular polygon.

After S1601, the image processing apparatus 1500 executes the processes of S1301 to S1303. After S1303, the image processing apparatus 1500 executes the process of S805. Specifically, the third obtaining unit 605 integrates the first three-dimensional shape data corrected by the correction unit 1501 and the second three-dimensional shape data to obtain the third three-dimensional shape data. After S805, the image processing apparatus 1500 executes the processes of S806 to S808 and, after S808, terminates the process of the flowchart illustrated in FIG. 16.

The image processing apparatus 1500 configured as described above can generate an accurate virtual viewpoint image in which, even in the case where there is an object near the reference point, a balance between the object near the reference point and an object distant from the reference point is achieved. Particularly, the image processing apparatus 1500 is an apparatus that corrects the first three-dimensional shape data by deleting the three-dimensional shape data corresponding to the unnecessary plane in the first three-dimensional shape data generated based on the distance information. The image processing apparatus 1500 configured as described above can generate a more accurate virtual viewpoint image by deleting the three-dimensional shape data corresponding to the unnecessary plane. Although the mode in which the image processing apparatus 1500 is applied to a vehicle is described in the present embodiment, the image processing apparatus 1500 is not limited to this and may also be applied to a monitoring system that monitors the inside or the outside of facilities or premises, spaces in which a road, a railroad, or the like is laid, or the like.

OTHER EMBODIMENTS

The image processing apparatus according to the present disclosure is not limited to the aforementioned embodiments and may be achieved in various embodiments. For example, the image processing apparatus may be connected to an image capturing apparatus and a ranging sensor to form an image processing system including the image processing apparatus, the image capturing apparatus, and the ranging sensor. In such a configuration, the virtual viewpoint image can be generated based on a captured image and point cloud data obtained in real time from the image capturing apparatus and the ranging sensor.

Although the mode in which the captured image data is still image data is described in the aforementioned embodiments, the captured image data is not limited to this and may be video data. In this case, it is only necessary to perform similar processes on data of each of frames included in the video data. In the case where the captured image data is the video data, the distance obtaining unit 602 repeatedly obtains the distance information at predetermined time intervals corresponding to frame intervals or the like. Note that, in this case, the second three-dimensional shape data corresponding to some frames among all frames does not have to be generated. For example, the second three-dimensional shape data may be generated only in the case where an environment that is distant from the reference point and that is obtainable from the distance information obtained by the ranging sensor greatly changes. The second three-dimensional shape data is thereby generated only at a necessary timing and computation cost required for the process of generating the second three-dimensional shape data can be thus reduced. Moreover, the generation of the second three-dimensional shape data only at this necessary timing is effective for real time processing that depends on the computation cost.

Although the mode in which the image processing apparatus includes the viewpoint obtaining unit 607 and the image generation unit 608 and thereby generates the virtual viewpoint image is described in the aforementioned embodiments, the image processing apparatus does not have to generate the virtual viewpoint image. For example, the image processing apparatus may be an apparatus that outputs the three-dimensional shape data with texture generated by the mapping unit 606 to the auxiliary storage device 704, the display unit 705, or the like without generating and outputting the virtual viewpoint image.

Moreover, although the mode in which the first three-dimensional shape data, the second three-dimensional shape data, and the third three-dimensional shape data corresponding to the space of 360 degrees around the vehicle are obtained is described in the aforementioned embodiments, the space to which the first three-dimensional shape data, the second three-dimensional shape data, and the third three-dimensional shape data correspond is not limited to this. In cases such as the case where the position of the virtual viewpoint, the direction of the line of sight, or the like is determined to be within a predetermined range, the first three-dimensional shape data, the second three-dimensional shape data, and the third three-dimensional shape data corresponding to a partial space of the space around the vehicle may be obtained.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image processing apparatus according to the present disclosure can obtain three-dimensional shape data with texture from which an accurate virtual viewpoint image can be generated, even in the case where there is an object is near the reference point.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-191006, filed Nov. 25, 2021 which is hereby incorporated by reference wherein herein in its entirety.

What is claimed is:

1. An image processing apparatus comprising:
   one or more hardware processors; and
   one or more memories storing one or more programs configured to be executed by the one or more hardware processors, the one or more programs including instructions for:
   (1) obtaining data of a captured image obtained by image capturing with an image capturing apparatus that captures an image of a surrounding of a reference point;
   (2) obtaining distance information indicating a distance from the reference point to an object present in a vicinity of the reference point;
   (3) obtaining first three-dimensional shape data corresponding to a shape of the object, based on the distance information;
   (4) obtaining second three-dimensional shape data that corresponds to the surrounding of the reference point other than the object and that is formed of one or more flat planes or curved planes;
   (5) obtaining third three-dimensional shape data in which the first three-dimensional shape data and the second three-dimensional shape data are integrated; and
   (6) mapping the captured image to the third three-dimensional shape data.

2. The image processing apparatus according to claim 1, wherein the distance information is point cloud data indicating a distance from the reference point to the object present in the vicinity of the reference point.

3. The image processing apparatus according to claim 2, wherein the first three-dimensional shape data corresponding to a shape of a surface of the object is obtained by identifying a plurality of planes that have a plurality of points indicated by the point cloud data as vertices, respectively.

4. The image processing apparatus according to claim 1, wherein the distance information is data of a depth map indicating a distance from the reference point to the object present in the vicinity of the reference point.

5. The image processing apparatus according to claim 1, wherein the second three-dimensional shape data includes three-dimensional shape data corresponding to a ground surface or a floor surface in the surrounding of the reference point.

6. The image processing apparatus according to claim 5, wherein the second three-dimensional shape data includes data of a three-dimensional shape that has a component in a height direction with respect to the three-dimensional shape corresponding to the ground surface or the floor surface.

7. The image processing apparatus according to claim 6, wherein the one or more programs further include an instruction for setting a distance from a position corresponding to the reference point to the three-dimensional shape that is included in the second three-dimensional shape data and that has the component in the height direction, and
   wherein the second three-dimensional shape data is obtained by generating data of the three-dimensional shape that has the component in the height direction based on the set distance.

8. The image processing apparatus according to claim 7, wherein the distance from the position corresponding to the reference point to the three-dimensional shape that has the component in the height direction is set based on a distance specified by a user.

9. The image processing apparatus according to claim 7, wherein the distance from the position corresponding to the reference point to the three-dimensional shape that has the component in the height direction is set based on the distance information.

10. The image processing apparatus according to claim 9, wherein the one or more programs further include an instruction for calculating a statistical value of the distance from the reference point to the object based on the distance information, and
    wherein the distance from the position corresponding to the reference point to the three-dimensional shape that has the component in the height direction is set based on the calculated statistical value.

11. The image processing apparatus according to claim 7, wherein the one or more programs further include an instruction for dividing a space around the reference point into a plurality of regions, and
    wherein the distance from the position corresponding to the reference point to the three-dimensional shape that has the component in the height direction is set for each of the regions subjected to the division.

12. The image processing apparatus according to claim 1, wherein the one or more programs further include an instruction for correcting the first three-dimensional shape data, and
    wherein the third three-dimensional shape data is obtained by integrating the first three-dimensional shape data after the correction and the second three-dimensional shape data.

13. The image processing apparatus according to claim 12, wherein the first three-dimensional shape data is corrected by deleting a plane that is among a plurality of planes indicated by the first three-dimensional shape data and in which a distance between vertices forming the plane is larger than a predetermined threshold, from the first three-dimensional shape data.

14. The image processing apparatus according to claim 13, wherein the threshold is determined for each of the planes indicated by the first three-dimensional shape data.

15. The image processing apparatus according to claim 13, wherein the threshold is determined based on at least one of information indicating a characteristic of a ranging apparatus that measures the distance indicated by the distance information, information indicating an installation position of the ranging apparatus, and information indicating a direction in which the ranging apparatus measures the distance.

16. The image processing apparatus according to claim 1, wherein the distance information is repeatedly obtained at predetermined time intervals, and
wherein the second three-dimensional shape data is reobtained in a case where a difference between two pieces of the distance information obtained at different timings is larger than a predetermined difference.

17. The image processing apparatus according to claim 1, wherein the one or more programs further include instructions for:
obtaining information on a virtual viewpoint; and
generating a virtual viewpoint image based on the information on the virtual viewpoint and the third three-dimensional shape data after the mapping of the captured image.

18. An image processing method comprising the steps of:
obtaining data of a captured image obtained by image capturing with an image capturing apparatus that captures an image of a surrounding of a reference point;
obtaining distance information indicating a distance from the reference point to an object present in a vicinity of the reference point;
obtaining first three-dimensional shape data corresponding to a shape of the object, based on the distance information;
obtaining second three-dimensional shape data that corresponds to the surrounding of the reference point other than the object and that is formed of one or more flat planes or curved planes;
obtaining third three-dimensional shape data in which the first three-dimensional shape data and the second three-dimensional shape data are integrated; and
mapping the captured image to the third three-dimensional shape data.

19. A non-transitory computer-readable storage medium storing a program for causing a computer to perform a control method of an image processing apparatus, the control method comprising the steps of:
obtaining data of a captured image obtained by image capturing with an image capturing apparatus that captures an image of a surrounding of a reference point;
obtaining distance information indicating a distance from the reference point to an object present in a vicinity of the reference point;
obtaining first three-dimensional shape data corresponding to a shape of the object, based on the distance information;
obtaining second three-dimensional shape data that corresponds to the surrounding of the reference point other than the object and that is formed of one or more flat planes or curved planes;
obtaining third three-dimensional shape data in which the first three-dimensional shape data and the second three-dimensional shape data are integrated; and
mapping the captured image to the third three-dimensional shape data.

* * * * *